United States Patent
Mehrvar

(10) Patent No.: US 10,306,344 B2
(45) Date of Patent: May 28, 2019

(54) METHOD AND SYSTEM FOR DISTRIBUTED CONTROL OF LARGE PHOTONIC SWITCHED NETWORKS

(71) Applicant: Hamid Mehrvar, Ottawa (CA)

(72) Inventor: Hamid Mehrvar, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 367 days.

(21) Appl. No.: 15/201,563

(22) Filed: Jul. 4, 2016

(65) Prior Publication Data

US 2018/0007455 A1  Jan. 4, 2018

(51) Int. Cl.
*H04B 10/04* (2006.01)
*H04Q 11/00* (2006.01)
*H04L 12/947* (2013.01)

(52) U.S. Cl.
CPC ......... *H04Q 11/0062* (2013.01); *H04L 49/25* (2013.01); *H04Q 11/0005* (2013.01); *H04Q 2011/0083* (2013.01); *H04Q 2011/0086* (2013.01)

(58) Field of Classification Search
CPC .......... H04Q 11/0062; H04Q 11/0005; H04Q 11/0001; H04Q 2011/0083; H04Q 2011/0086; H04Q 11/0066; H04Q 2011/0039; H04Q 2011/0052; H04Q 2011/0092; H04Q 2213/1304; H04Q 1/04; H04Q 2011/0041; H04Q 2011/0047;

(Continued)

(56) References Cited

U.S. PATENT DOCUMENTS 6,330,381 B1 * 12/2001 Lu .................... H04B 10/25137
                                            385/123
6,832,051 B2 * 12/2004 Lu .................... H04B 10/25137
                                            385/123

(Continued)

FOREIGN PATENT DOCUMENTS

| CN | 102394782 A | 3/2012 |
| CN | 102769569 A | 11/2012 |
| CN | 105610709 A | 5/2016 |

OTHER PUBLICATIONS

Farrington, Nathan et al., "Helios: A Hybrid Electrical/Optical Switch Architecture for Modular Data Centers", SIGCOMM'10, Aug. 30-Sep. 3, 2010, 12 pages.

*Primary Examiner* — Hibret A Woldekidan

(57) ABSTRACT

The present application provides methods of determining bandwidth demands and allocating bandwidth for a network including a plurality of groups of sub-networks. Each sub-network includes a plurality of server racks and an aggregation switch node configured to control the flow of traffic to and from the plurality of server racks in the subnetwork. The aggregation switch nodes in the network are optically coupled to one another via at least one switch controlled by a switch controller. Each group of subnetworks of the plurality of groups of subnetworks also includes a group controller in communication with each of the aggregation switch nodes in the group. The group controllers are communicatively coupled to one another. The interaction between the aggregation switch nodes, the group controllers and the switch controllers enable distributed and dynamic control of switching between the subnetworks.

25 Claims, 17 Drawing Sheets

(58) Field of Classification Search
CPC ... H04Q 2011/0054; H04Q 2011/0058; H04Q 2011/0064; H04Q 2213/1301; H04Q 2213/13523; G02B 6/35; G02B 2006/12145; G02B 6/3546; G02B 6/3556; H04B 10/271; H04B 10/27; H04J 14/0212; H04J 14/0257; H04J 14/0267; H04J 14/0217; H04L 12/462; H04L 49/25; H04L 41/0896; H04L 49/15; H04L 49/351
USPC ............................ 398/45, 48, 49, 50, 56, 57
See application file for complete search history.

(56) References Cited

U.S. PATENT DOCUMENTS

| | | | | |
|---|---|---|---|---|
| 7,409,159 | B2* | 8/2008 | Izadpanah | H04B 10/1149 379/56.1 |
| 8,351,798 | B2* | 1/2013 | Edirisinghe | H04B 10/07953 398/193 |
| 9,184,845 | B1* | 11/2015 | Vahdat | H04B 10/27 |
| 9,332,323 | B2* | 5/2016 | Zhang | H04J 14/0204 |
| 9,462,359 | B2* | 10/2016 | Mehrvar | H04Q 11/0005 |
| 9,491,526 | B1* | 11/2016 | Zhao | H04Q 11/0005 |
| 9,654,852 | B2* | 5/2017 | Yin | H04Q 11/0062 |
| 9,658,403 | B2* | 5/2017 | Mehrvar | G02B 6/3546 |
| 9,661,405 | B2* | 5/2017 | Mehrvar | H04L 49/356 |
| 9,876,572 | B2* | 1/2018 | Srinivas | H04Q 3/0083 |
| 10,070,207 | B2* | 9/2018 | Adiletta | H03M 7/40 |
| 2003/0016411 | A1* | 1/2003 | Zhou | H04Q 11/0062 398/5 |
| 2009/0250236 | A1 | 10/2009 | Corwin et al. | |
| 2012/0008945 | A1* | 1/2012 | Singla | H04J 14/0204 398/49 |
| 2013/0322427 | A1 | 12/2013 | Stiekes | |
| 2016/0080266 | A1* | 3/2016 | Fujii | H04L 45/64 370/236 |
| 2017/0325009 | A1* | 11/2017 | Mehrvar | H04Q 11/0005 |

* cited by examiner

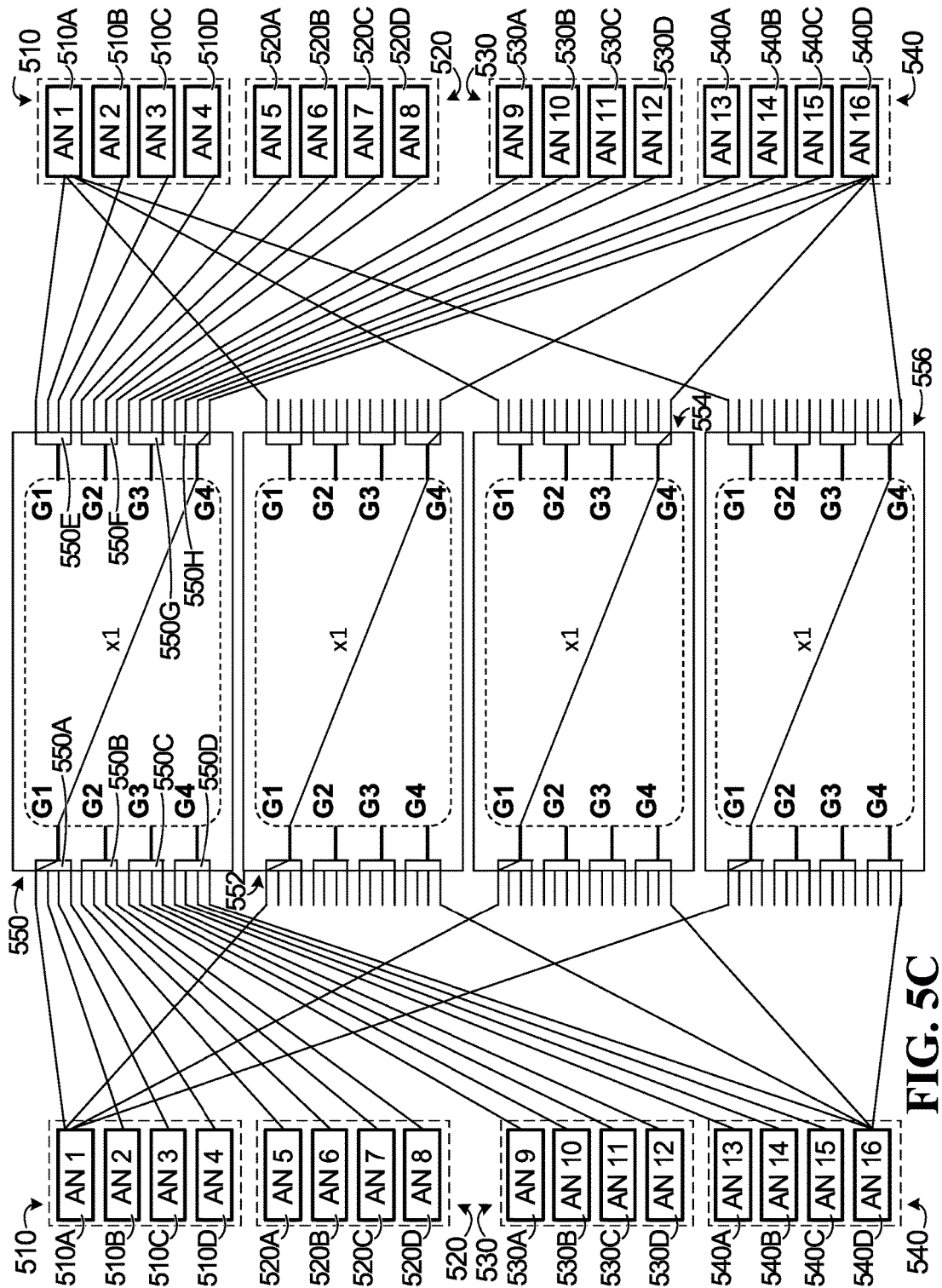

METHOD AND SYSTEM FOR DISTRIBUTED CONTROL OF LARGE PHOTONIC SWITCHED NETWORKS

FIELD OF THE DISCLOSURE

This application relates to photonic networks, in particular a distributed control architecture for a photonic network.

BACKGROUND

As demand for datapath capacity in communication networks using photonic switches continues to increase, new problems arise in trying to implement the networks than can meet such demand.

One such problem is achieving a low delay through a switch fabric of the photonic switches as control decisions and bandwidth adjustments need to be made quickly, i.e. for example a desired target of at least at the micro-second level. Another problem is trying to ensure a loss-less switch. Furthermore, due to lack of photonic buffering, synchronizing traffic for a large collection of servers that feed into the photonic switches can poses various challenges. A further problem is propagation delay between multiple photonic switches in the network. Another problem may be the control processing power that is needed for switch controllers that control the optical switches to ensure bandwidth assignment calculation can be performed in a submicrosecond time frame.

SUMMARY OF THE DISCLOSURE

According to embodiments of the disclosure there are various methods of determining bandwidth demands and allocating bandwidth for a network that includes a plurality of groups of sub-networks and each subnetwork includes a plurality of server racks. Each subnetwork in a group of subnetworks includes an aggregation switch node configured to control the flow of traffic to and from the plurality of server racks in the subnetwork. The aggregation switch nodes in the network are optically coupled to one another via at least one switch controlled by a switch controller. Each group of subnetworks of the plurality of groups of subnetworks includes a group controller in communication with each of the aggregation switch nodes in the group of subnetworks and the group controllers communicatively coupled to one another.

In a first embodiment, there is provided a method for determining bandwidth that involves, at a group controller of a first group of subnetworks, monitoring the aggregation switch nodes of each subnetwork in the first group for bandwidth demands that each subnetwork of the first group has for other subnetworks within the first group of subnetworks, and for other groups of subnetworks in the network. The method also involves the group controller communicating the bandwidth demands for the subnetworks of the first group with each of the other group controllers in the network.

The group controller monitoring bandwidth demands may further involve classifying the bandwidth demands of the first group of subnetworks with each other group of subnetworks and the bandwidth demands of each subnetwork of the first group of subnetworks with each other group of subnetworks. Classifying the bandwidth demands of the group of subnetworks may further involve consolidating the bandwidth demands from all of the subnetworks in the first group of subnetworks and determining the consolidated bandwidth demands with the other groups of subnetworks on a group by group basis.

In some embodiments, the group controller monitoring bandwidth demands may involve the group controller receiving bandwidth demand information for the server racks in a respective subnetwork pushed from the aggregation switch node of the respective subnetwork. In other embodiments, the group controller monitoring bandwidth demands may involve the group controller receiving bandwidth demand information from the aggregation switch node of a respective subnetwork, for the server racks in the respective subnetwork in response to a poll from the group controller.

In a second embodiment, there is provided a method of allocating bandwidth involving, at a group controller of a first group of subnetworks, receiving from a group controller of each other group of subnetworks, the bandwidth demands for each other group of subnetworks with the first group of subnetworks. The method also involves allocating bandwidth capacity between the first group of subnetworks and the other groups of subnetworks based on the received bandwidth demands. The method further involves sending each other group controller the allocated bandwidth capacity between the first group of subnetworks and the other groups of subnetworks.

In some embodiments, the method further involves the group controller sending to the switch controller the allocated bandwidth capacity between the first group and each of the other groups. In some embodiments this may involve the group controller sending the at least one switch an indication of a change in the allocated bandwidth capacity between a previous allocated bandwidth capacity for the first group and each of the other groups and a current allocated bandwidth capacity for the first group and each of the other groups.

In some embodiments, the method may further involve the switch controller adjusting the bandwidth capacity of the at least one switch based on information received from each of the group controllers regarding allocated bandwidth capacity between each of the groups of subnetworks and each of the other groups of subnetworks.

In a third embodiment, there is provided a method of allocating bandwidth that involves, at a group controller of a first group of subnetworks, receiving from a group controller of each other group of subnetworks, the bandwidth capacity allocation granted for the first group of subnetworks with each other group of subnetworks. The method further involves allocating bandwidth capacity between each of the subnetworks of the first group of subnetworks and the other groups of subnetworks based on the received bandwidth capacity allocation.

A fourth embodiment of the disclosure includes a group controller configured to control a first group of subnetworks, a subnetwork being defined as a plurality of server racks. The group controller is in communication with a plurality of aggregation switch nodes. Each aggregation switch node is configured to control traffic flow to and from a plurality of server racks in a respective subnetwork. The group controller is in communication with at least one other group controller that is configured to control at least one other group of subnetworks. The groups of subnetworks are communicatively coupled to one another via at least one switch controlled by a switch controller. The group controller includes a processor and a computer-readable medium having stored thereon computer-executable instructions. When executed by the processor, the computer-executable instructions cause the group controller to monitor bandwidth demands that each subnetwork of the first group of subnetworks has for server racks in the subnetwork and subnetworks of the at least one other group of subnetworks, via the aggregation switch nodes of each subnetwork in the first group of subnetworks and communicate the bandwidth demands for the subnetworks of the first group of subnetworks with each of the at least one other group controller.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which:

FIG. 5C is an example of a switching configuration for an unbalanced traffic load according to an aspect of the disclosure;

DETAILED DESCRIPTION OF EMBODIMENTS

Figure 1:
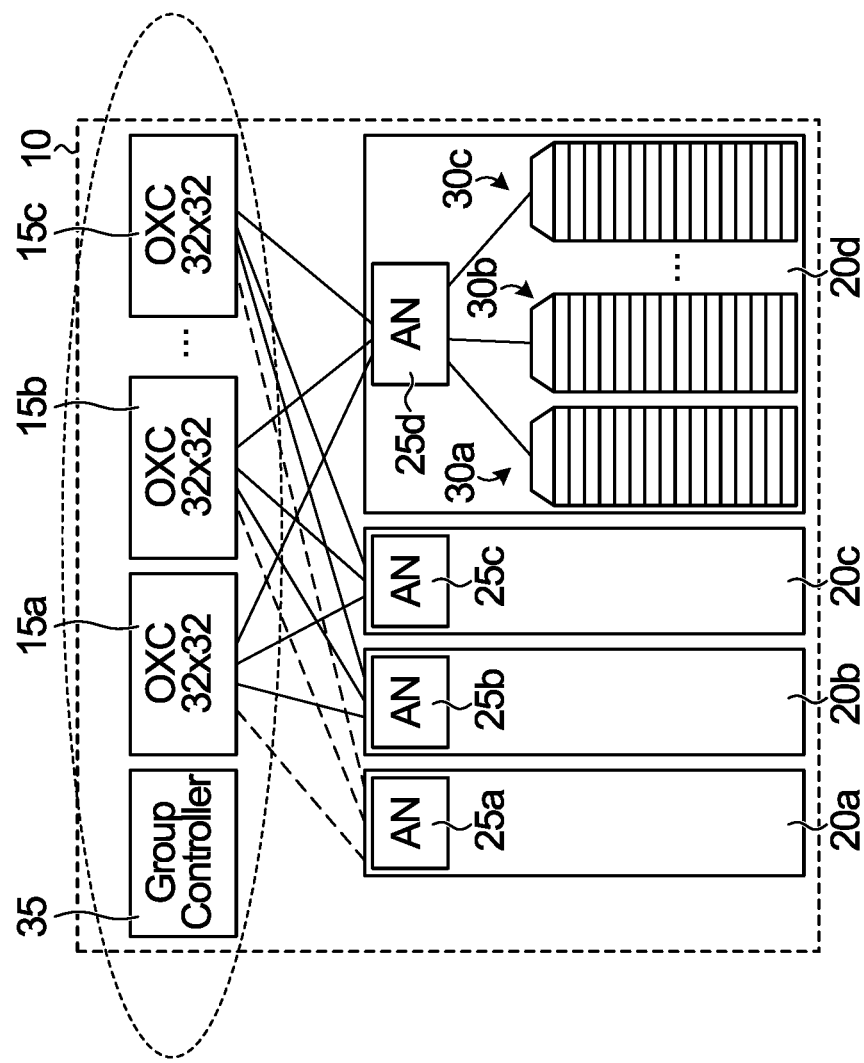
FIG. 1 is a schematic diagram of a portion of a network including a group of subnetworks than each include multiple server racks and a group controller for the group of subnetworks for use in a distributed control architecture according to an aspect of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Architectures for controlling photonic switching systems of multiple server networks have often been centralized and synchronized. However, with user demand for content to be transmitted over communication networks and the switching systems growing to accommodate petabit/second traffic, architectures will likely need to change as well. Consider a data center with 256 edge switches (or aggregation switch nodes) that interface with top of rack (TOR), next generation top of rack (ng-TOR) or end of rack (EOR) server architectures used in data centers and a set of photonic switches (as photonic fabric). It is difficult to have a single controller (e.g. a switch controller) to schedule traffic through the photonic fabric connecting the servers of a large number of server racks. In such an arrangement, two issues that arise make the use of a single centralized controller difficult. The first issue relates to the propagation delay between the aggregation switches and core switches in the network and the second issue relates to the processing power that a single centralized controller would need to utilize in order to ensure a sub micro-second timeframe for calculations needed for bandwidth assignment. A control cycle is defined as the frequency of adjusting the switch connectivity bandwidth. In a particular implementation, the control cycle may be approximately 1 millisecond. This cycle represents the time interval the bandwidth changes are adjusted given aggregate bandwidth changes are not very fast. Out of that 1 millisecond timeframe, there may be a pause in traffic of approximately 10 μsec to 20 μsec to allow both flushing of traffic of a previous cycle through the switch, as well as the establishment of new switch connections. The pause in traffic allows traffic loss to be minimized or, ideally, eliminated and a change of switch connectivity.

Aspects of the present disclosure include a distributed control architecture to address both computational complexity of switching control for large scale systems and the propagation delay issue. The present disclosure may also include a distributed control algorithm that works in cooperation with the distributed control architecture. Aspects of the present disclosure may provide one or more of the following features: a scalable solution for control of large scale, for example, but not limited to, high speed photonic switch systems such as those that can support petabit/s speeds; distributed control with distributed processing; alleviate issues associated with propagation delay; and may be applicable to both synchronous and asynchronous photonic packet systems.

A typical data center networking environment may have, as indicated above, up to 256 aggregation switch nodes. Each aggregation switch node is connected to multiple server racks. Each aggregation switch node handles communication between the server racks coupled to the aggregation switch node and the server racks coupled to the other aggregation switch nodes in the rest of network. The aggregation switch node can be considered a controller that oversees the traffic flow of server racks that the aggregation switch node is associated with that prepares and updates reports detailing the bandwidth demand status of queues of data being transmitted to other groups. In some embodiments, the propagation delay between aggregation switch nodes and photonic core switches (photonic segment) in the networking environment may be reduced by creating the distributed control architecture by grouping the groups of server racks into sets of groups of server racks and assigning a group controller to each of the respective sets. The group controllers communicate with each other, with the aggregation switch nodes in their groups and with a switch controller controlling the switches connecting the server racks.

The processing time may be reduced using distributed processing wherein each group controller communicates with the set of aggregation switch nodes in its respective group. In some embodiments, the group controllers are responsible for monitoring the bandwidth demands of the aggregate nodes, consolidating that information and informing other group controllers of the bandwidth demands that its members have for the other groups. In some embodiments of the disclosure, upon receiving such consolidated reports from other group controllers, the group controller is responsible for allocating bandwidth capacity of its own members to the other groups based on the consolidated reports. In some embodiments of the disclosure, upon having been granted bandwidth capacity by other group controllers for other groups, the group controller is also responsible for allocating that capacity to its members.

In some embodiments of the disclosure, the distributed control architecture involves interconnecting the group controllers to one another using a mesh or a ring arrangement. Communication between the aggregation switch nodes and the group controller may use a low-rate optical connection. A low rate optical connection may be, for example, 2.5 Gbps to 10 Gbps. In some embodiments, the group controller is located in proximity to the collection of server racks in the group it is associated with in order to reduce propagation delay between the group controller and aggregation switch nodes. Communication between the group controllers may use a higher rate optical connection. A higher rate optical connection may be, for example, 10 GHz to 100 GHz. The group controller may be connected to the aggregation switch nodes in the group associated with the group controller using a star or ring arrangement. The group controller may be implemented in the form an integrated circuit card or so-called "pizza box" server equipment.

The aggregation switch nodes may be implemented in the form of an integrated circuit card using field programmable gate array (FPGA), or application specific integrated circuit (ASIC) to implement both control and photonic framing circuitry for send and receive photonic frames to/from photonic switches.

FIG. 1 illustrates an example of a single group 10 of server racks that is part of a distributed control architecture. The group 10 includes multiple optical cross connect switches (OXC) 15a, 15b, 15c that are each coupled to multiple pods 20a, 20b, 20c, 20d. The term pod is used to refer to a group of server racks, each server rack can support a plurality of servers. While pod may be a term common to a group of server racks in a data center environment, more generally, the pod may be referred to herein as a subnetwork. For example pod 20d includes an aggregation switch node (AN) 25d that is connected to each of multiple server racks 30a, 30b, . . . , 30c. The aggregation switch node 25d is responsible for aggregating traffic from the server racks 30a, 30b, . . . , 30c and is an interface to the optical cross connect switches 15a, 15b, 15c. Pods 20a, 20b and 20c each include a respective aggregation switch node 25a, 25b and 25c, but the server racks are not shown in pods 20a, 20b and 20c. The group 10 also includes a group controller 35. The group controller 35 communicates with the aggregation switch nodes 25a, 25b, 25c, 25d in the group 10 as well as with the group controllers of other groups and a switch controller (not shown in FIG. 1), as will be described in further detail below.

Figure 2:
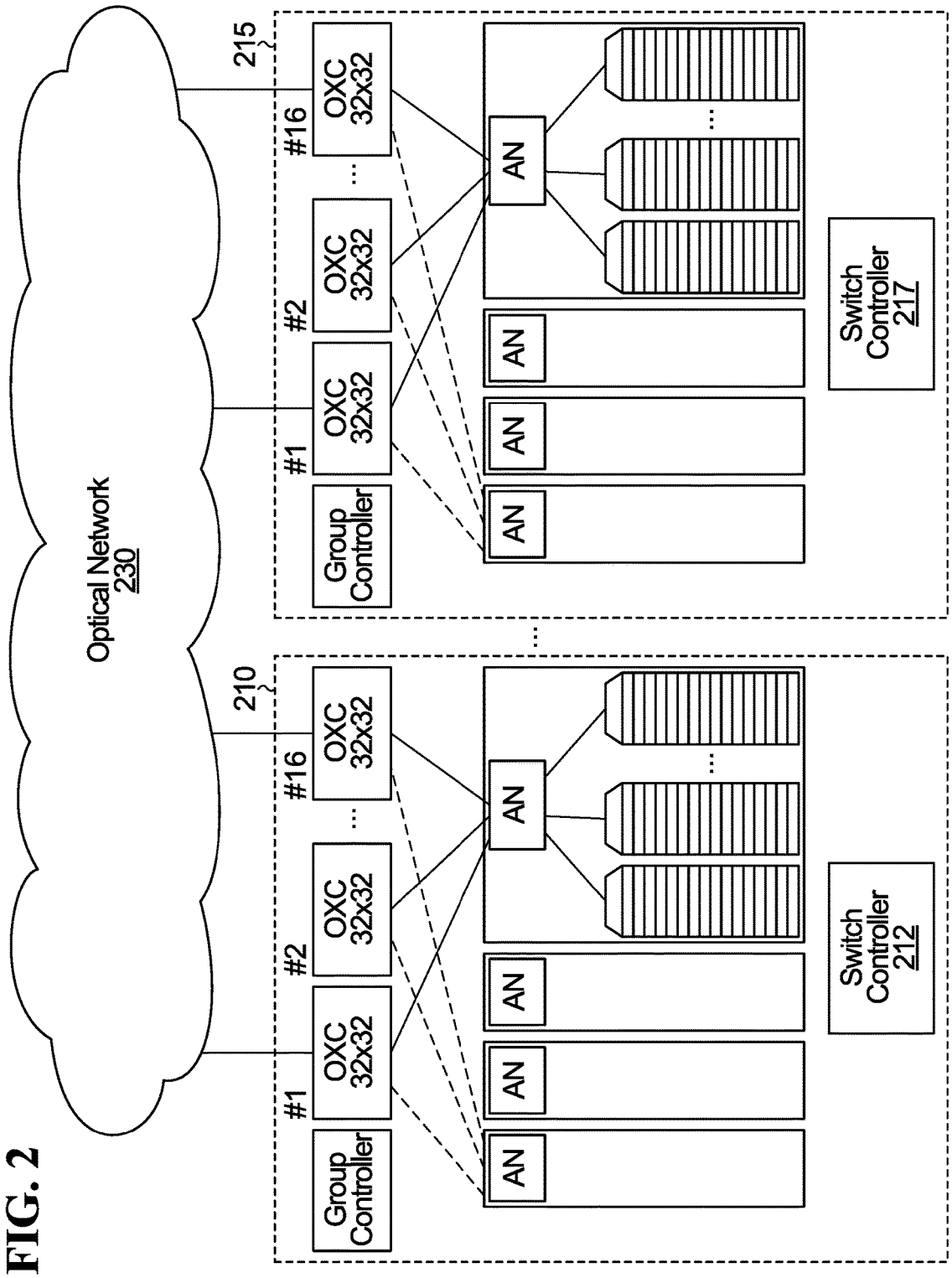
FIG. 2 is a schematic diagram of a larger view of a network according to an aspect of the disclosure including two groups of the type of FIG. 1.

FIG. 2 illustrates an example of multiple groups 210, 215 that are part of a distributed control architecture. Each of the groups 210, 215 includes similar features described above with regard to FIG. 1 and thus will not be described again in detail. While connections are not shown in FIG. 2 between each of the aggregation switch nodes and the optical cross-connect switches, it is understood that there would be connectivity between those elements. The optical cross-connect switches of the groups 210 and 215 interface with one another via an optical network 230. Switch controllers 212, 217 that control the optical cross connect switches in each respective group are shown in each of groups 210 and 215. The switch controllers 212, 217 may set up the switches in collaboration with the group controllers. The switch controllers and group controllers are connected together and together form the distributed architecture. While groups 210 and 215 each include a switch controller, it is to be understood that not every good would have a switch controller. A switch controller in one group may be used to control switches in one or more nearby groups. In a practical implementation, multiple groups of pods as described above may collectively be considered as part of a data center. The groups may not necessarily be collocated on a same physical premise, but could be located in several physical premises within a local proximity of approximately 2 kilometers. In a practical implementation of the disclosure, a large number of server racks, each having their associated aggregation switch node, are considered, for example ranging from 32 to 256, possibly more. In some embodiments, each aggregation switch node has 16 or more interfaces allowing 32× interface rate capacity (in and out) to a given switch.

Figure 3:
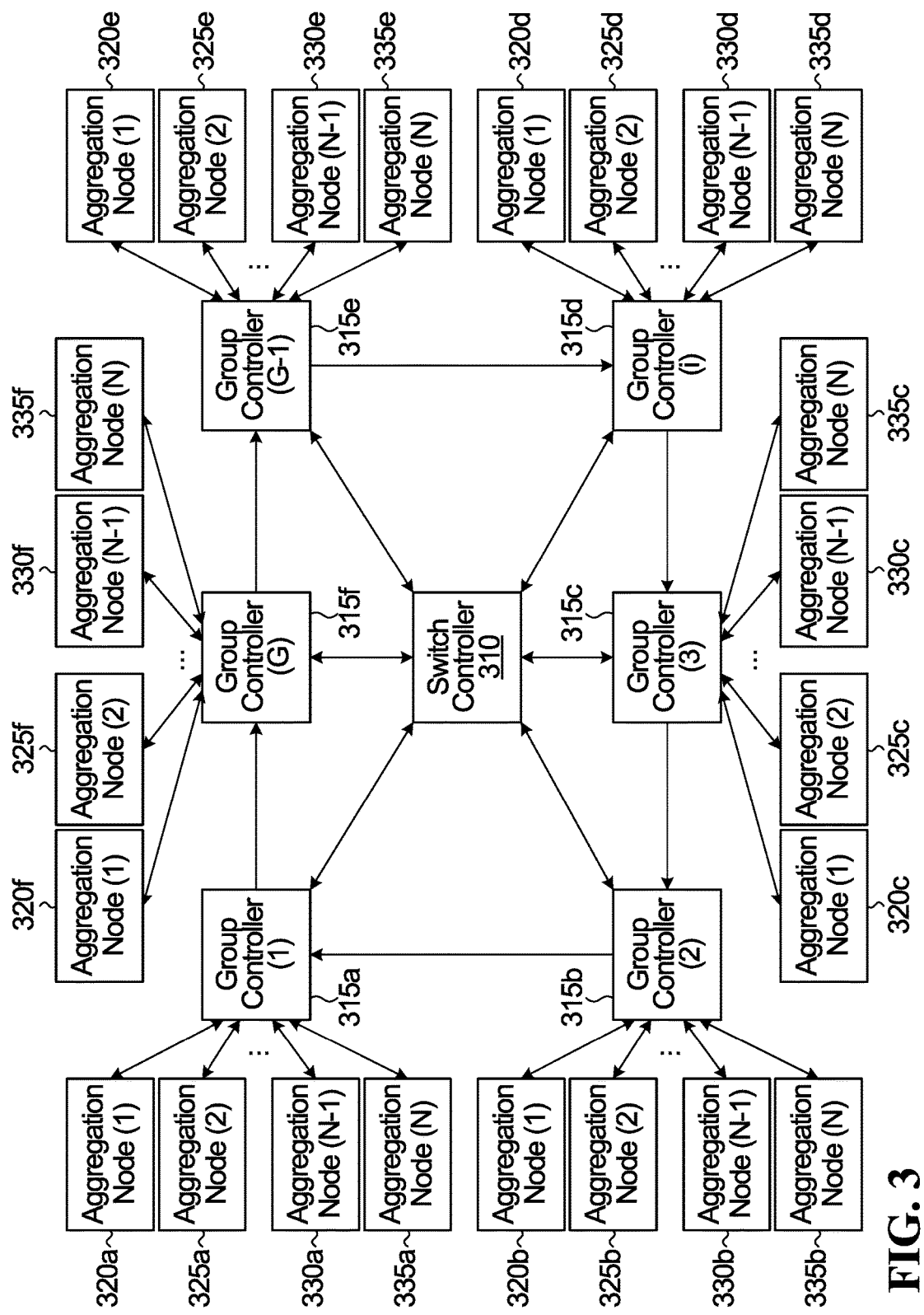
FIG. 3 is a block diagram illustrating an example of connectivity of elements in a network for a distributed control architecture according to an aspect of the disclosure according to an aspect of the disclosure.

Referring now to FIG. 3, a block diagram of connectivity of various elements in the distributed control architecture will be described. A switch controller 310 is shown communicatively coupled to each of G group controllers 315a, 315b, 315c, 315d, 315e, 315f in a star connection, where the switch controller 310 is at the center. The group controllers 315a, . . . , 315f are communicatively coupled to one another in a ring connection, such that each of the group controllers is coupled to two adjacent group controllers. For example, group controller 315a is communicatively coupled to group controller 315b and group controller 315f. Each group controller is communicatively coupled to N aggregation switch nodes. For example, group controller 315a is communicatively coupled to aggregation switch nodes 320a, 325a, 330a and 335a.

FIG. 3 shows only control connectivity. It does not show the connectivity of the switch controller to the switches, the group controllers to the switches, the aggregation switch nodes to the switches, or the aggregation switch nodes to the server racks they are associated with.

Each of the group controllers of a respective group is a centralized controller for all of the aggregation switch nodes that belong to the group. While FIG. 3 shows each of the aggregation switch nodes connected to the group controller in a star arrangement, the group controller could alternatively be connected to the aggregation switch nodes in a ring arrangement, for example.

While FIG. 3 shows the group controllers connected to one another in a ring arrangement, the group controllers could alternatively be connected in mesh arrangement, for example. The group controllers are connected to each other to minimize the effect of propagation delay.

While FIG. 3 shows the group controllers connected to a single switch controller, there may be more than one switch controller. Furthermore, the switch controller can be centralized, or it may be distributed. Both sets of group controllers and switch controllers could be connected in a connectivity scheme such as ring, as a non-limiting example.

The numbers G and N of group controllers and aggregation switch nodes, respectively, in FIG. 3 are implementation specific. Therefore, the distributed architecture described herein enables a "pay-as-you-grow" capability in which additional group controllers can be added as additional groups of server racks are added to the networking environment.

Figure 4:
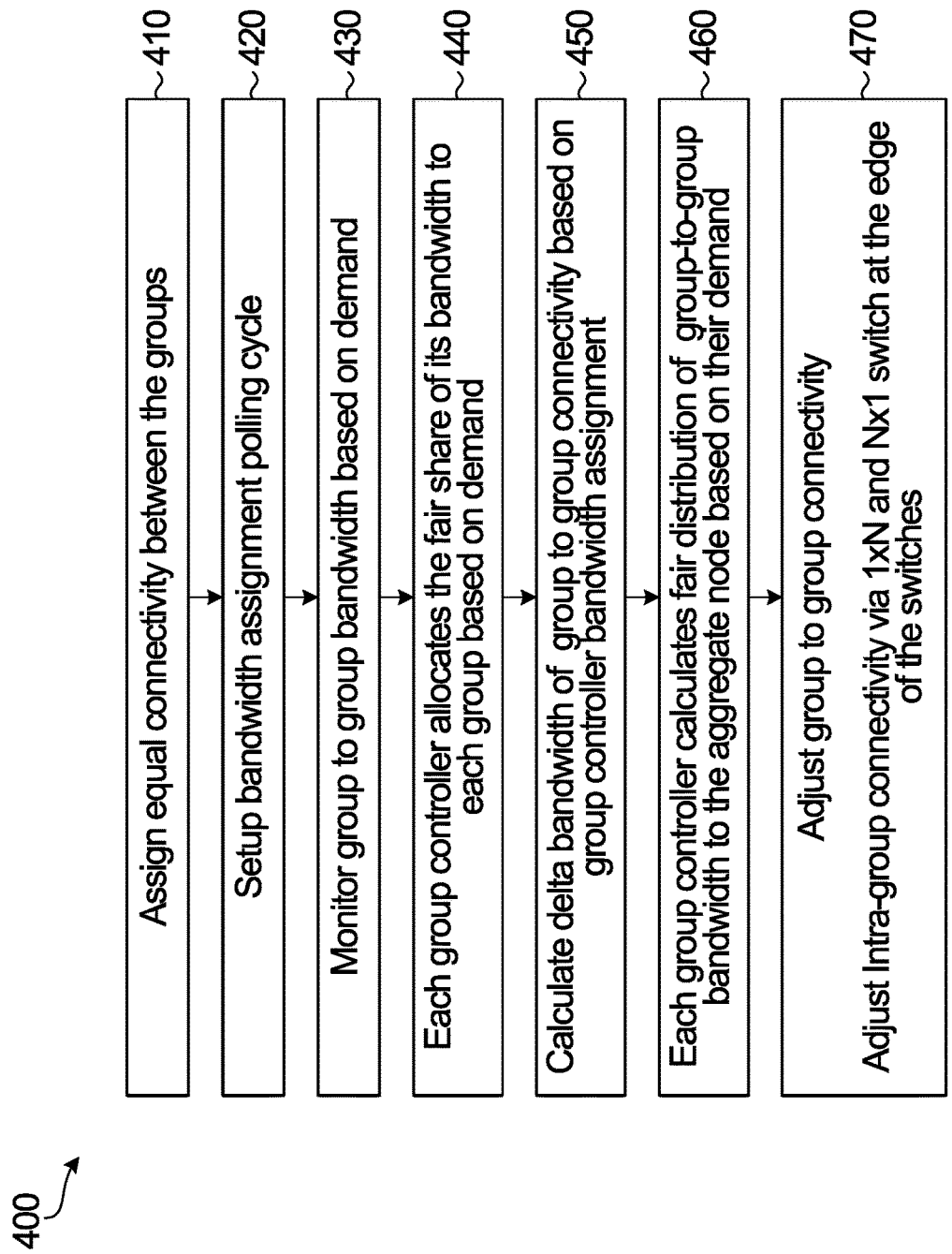
FIG. 4 is a flow chart describing an example of a method for a distributed control architecture according to an aspect of the disclosure.

FIG. 4 is flow chart 400 that generally describes multiple functionalities of a control algorithm that may be used according to embodiments of the disclosure. The functionalities in the flow chart 400 describe various aspects of the control architecture performed by a group controller. The various functionalities will be described in further detail below after the description of FIG. 4.

It is to be understood that each of the group controllers could perform the functionalities of flow chart 400. It is also to be understood that the functionalities may not necessarily all be performed, or be formed in the particular order described in the flow chart of FIG. 4. As such, FIG. 4 may be considered to be an overall description of the functionalities of the group controllers as opposed to a specific "start-to-finish" list of steps that are always performed in a sequential and consistent fashion as illustrated in the flow chart.

A first functionality is shown in step 410 involves initially assigning equal connectivity between all groups so as to begin with a balanced system having equally allocated bandwidth capacity between all server racks in the network. Such an assignment of connectivity may be performed when the network is brought online or at other times during operation, for example if and when the server racks are reorganized for a more balanced distribution. During operation of the network the assigned and allotted bandwidth between the groups will change over time. If the assigned and allotted bandwidth becomes severely out of balance amongst the groups, the member of the groups could potentially be redistributed, as needed or desired, to provide an improved balance.

In step 420, to ensure that each of the group controllers has an opportunity to transmit pertinent information to the other group controllers at least once an allocation cycle, a polling cycle may be set up. At an allotted time in the polling cycle each group controller know to be active in the network is scheduled to transmit relevant information to other active group controller so that each active group controller is aware of the bandwidth needs of the other active group controllers. When the group controller is not transmitting the bandwidth needs of its group, or receiving bandwidth needs of other groups, the group controller can be performing the monitoring and allocating of bandwidth steps described in further detail below. In some instances the group controller may be capable of simultaneously transmitting or receiving information from other group controllers and performing one or more of the step below.

Step 430 of flow chart 400 involves monitoring the group to group bandwidth based on the demand. The group controller determines the bandwidth demand for each aggregation switch node of the group for servers in the group and for servers in other groups and forwards the demand for the other groups to the group controllers of the other groups.

Step 440 of flow chart 400 involves each group controller allocating a fair share of its bandwidth capacity to the other groups based on the bandwidth demand received from the other groups.

Step 450 of flow chart 400 involves each group controller calculating the change in, or delta, bandwidth of the group-to-group connectivity based on the allocated bandwidth capacity. Each group controller provides the switch controller this delta bandwidth of the group-to-group connectivity.

Step 460 of flow chart 400 involves intra-group allocation of the bandwidth capacity allocated by the other groups. The group controller calculates fair distribution of group-to-group bandwidth to the aggregation switch nodes of the group. The aggregation switch nodes control the allocated bandwidth with respect to the servers overseen by the aggregation switch nodes.

At step 470 of flow chart 400, the switch connectivity may change at two levels, wholesale group-to-group change and within-a-group (intra-group) change. Group-to-group connectivity of the switches is adjusted by the switch controller. Intra-group connectivity is adjusted by 1×N switching elements at the input and N×1 switching elements at the output of a switch as will be described below with regard to FIGS. 5A, 5B and 5C. For group-to-group change, when taking bandwidth from one group and giving it to another group, the group controller that loses an interface connection ensures that there is no traffic on that interface before it is lost.

The change in intra-group bandwidth, i.e. member-to-group or group to member bandwidth, can tend to vary substantially on an allocated period to allocated period basis. However, the group-to-group change is the change in the total bandwidth between groups and is considered to change slowly over time. This change is typically not a significant change on an allocated period to allocated period basis. For example, in a first allocated period three members in a first group may want to transmit to three members in a second group and in a second allocated period three different members in the first group may want to transmit to three different members in the second group. In a situation in which the total bandwidth used by the three communications is the same in both allocated periods, the group-to-group allocated bandwidth will be the same as the traffic is still being routed from the first group to the second group. However, the member-to-group bandwidth allocation in each period is different because different members are utilizing the bandwidth.

At some point after the bandwidth capacity is allocated, each of the aggregate nodes may prepare a new report that can be sent to the group controller overseeing the group, which is captured in the functionality of step 420.

Figure 5A:
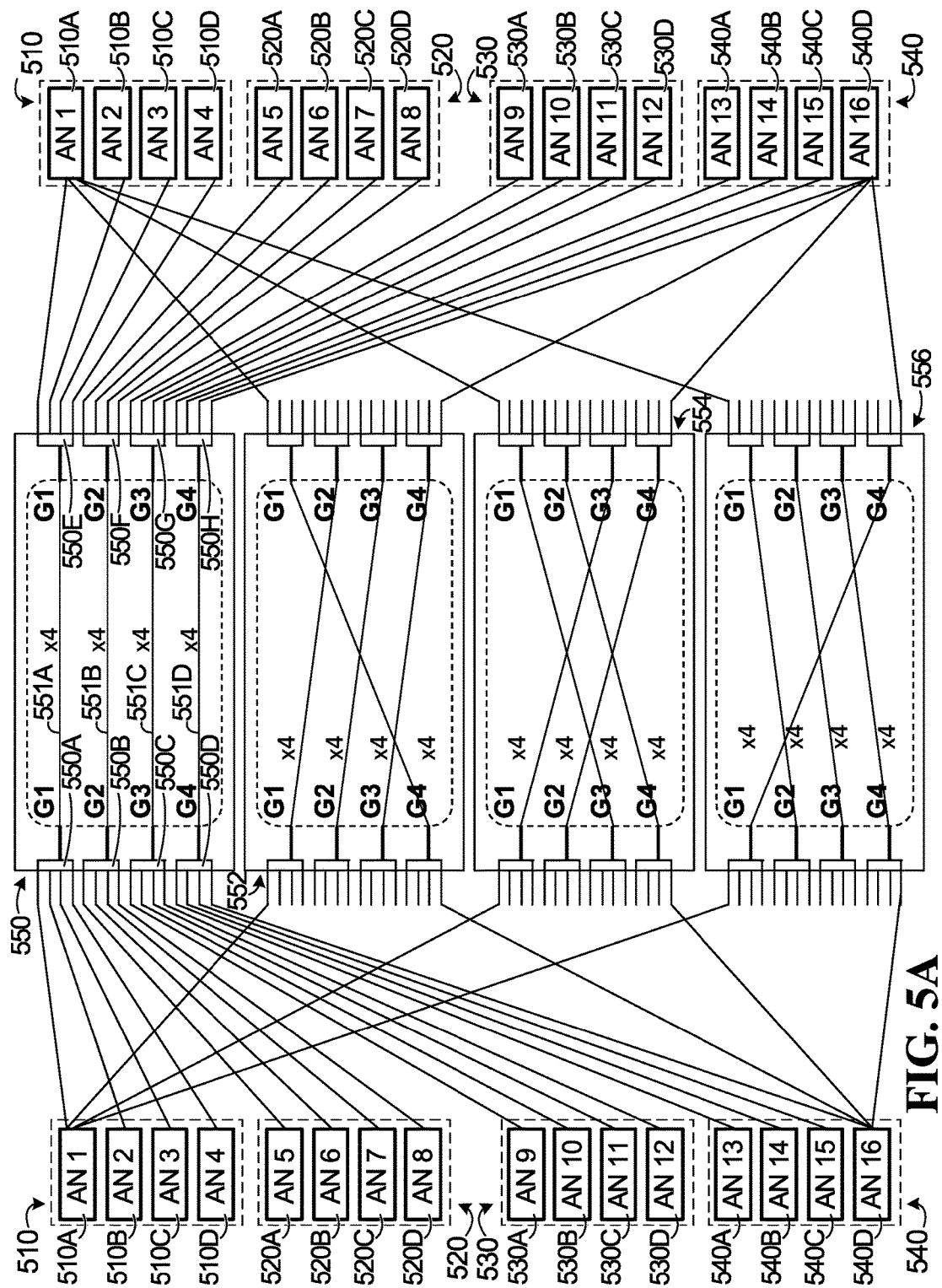
FIG. 5A is an example of a switching configuration for a balanced traffic load according to an aspect of the disclosure.

FIG. 5A is an example of a switching configuration in which there are four groups 510, 520, 530, 540 of pods of server racks in which each group includes four pods of server racks, for a total of 16 pods. Each pod is represented in FIG. 5A by its corresponding aggregation switch node 510A, . . . , 510D, 520A, . . . , 520D, 530A, . . . , 530D, 540A, . . . , 540D. The aggregation switch nodes are coupled to four 16 input by 16 output switches 550, 552, 554, 556. In FIG. 5A, each switch is shown to include 16 inputs that couple to each of one of the aggregation switch nodes. Therefore, a first four inputs correspond to the aggregation switch nodes in the first group 510, a next four inputs correspond to the aggregation switch nodes in the second group 520, a next four inputs correspond to the aggregation switch nodes in the third group 530 and the last four inputs correspond to the aggregation switch nodes in the fourth group 540. The outputs of the switches are arranged in a similar manner to the aggregation switch nodes of the four groups 510, 520, 530, 540. The connections between the inputs and output of the switches are shown as four separate planes 551A, 551B, 551C, 551D one plane for each group, where each plane has four connections, i.e. one connection for each aggregation switch node.

FIG. 5A is representative of balanced group-to-group traffic. In the first switch 550, the four switch inputs received from first group 510 are routed to the four switch outputs output to the first group 510 and similarly the inputs from the second, third and fourth groups 520, 530, 540 are routed to the second, third and fourth groups 520, 530, 540, respectively. In the second switch 552, the four switch inputs received from first group 510 are routed to the four switch outputs output to the second group 520 and similarly the inputs from the second, third and fourth groups 520, 530, 540 are routed to the third, fourth and first groups 530, 540, 510, respectively. In the third switch 554, the four switch inputs received from first group 510 are routed to the four switch outputs output to the third group 530 and similarly the inputs from the second, third and fourth groups 520, 530, 540 are routed to fourth, first and second groups 540, 510, 520, respectively. In the fourth switch 556, the four switch inputs received from first group 510 are routed to the four switch outputs output to the fourth group 540 and similarly the inputs from the second, third and fourth groups 520, 530, 540 are routed to first, second and third groups 510, 520, 530, respectively.

Switch 550 in FIG. 5A includes four 4×1 switches 550A, 550B, 550C, 550D at the input and four 1×4 switches 550E, 550F, 550G, 550H at the output. Each 4×1 switch allows the inputs of a group to be routed from member-to-group (and each 1×4 switch allows the outputs of a group to be routed from group-to-member) amongst the four connections on each plane internal to the switch. The other three switches 552,554,556 operate in a similar manner.

It is to be understood that the 4×1 and 1×4 switches may be part of, and collocated with, the core switches or these switches may be collocated with the grouped aggregated nodes.

Figure 5B:
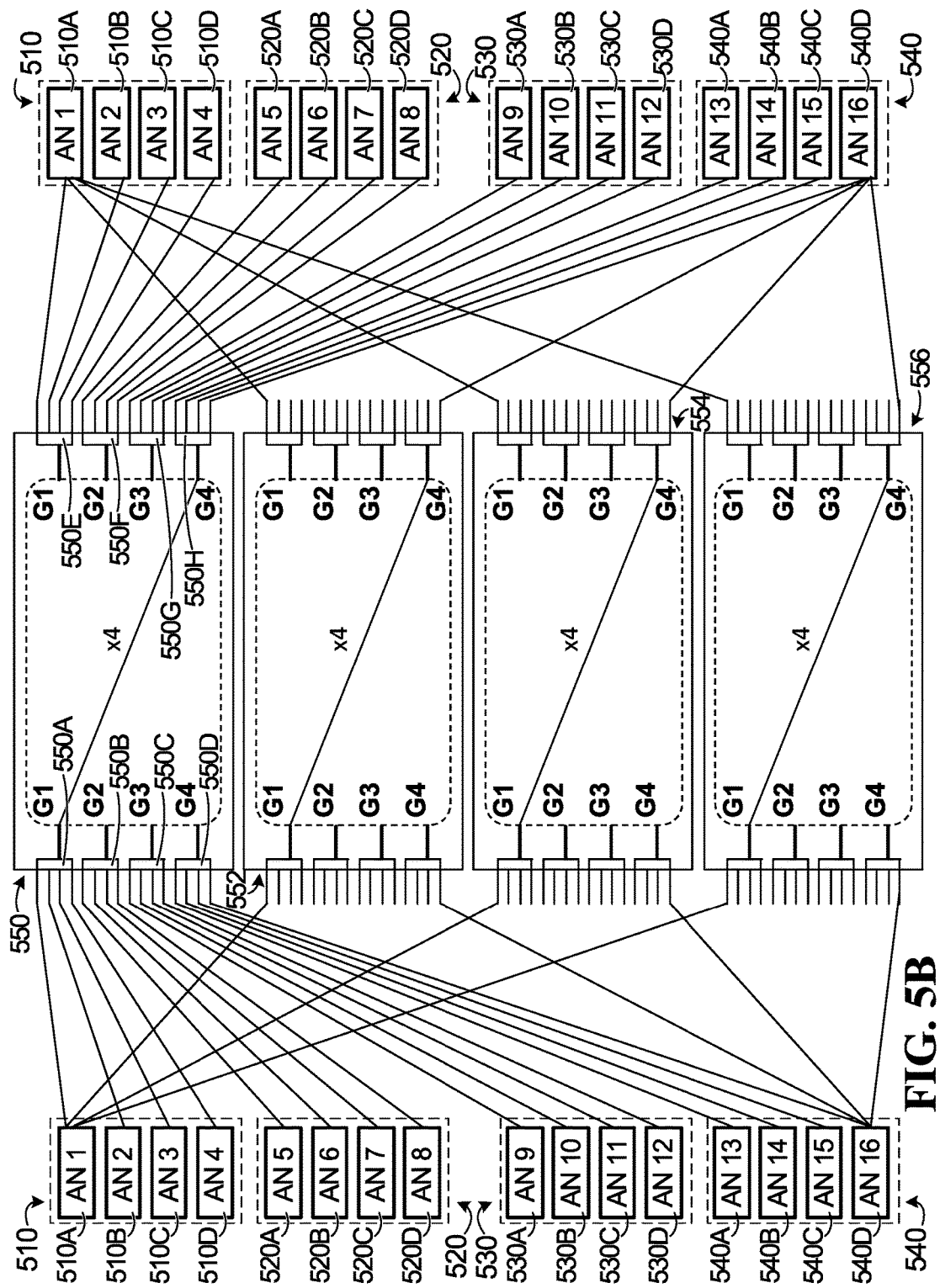
FIG. 5B is an example of a switching configuration for an unbalanced traffic load according to an aspect of the disclosure.

FIG. 5B is an example of a switching configuration having similar architecture to the arrangement of FIG. 5A, but in FIG. 5B group-to-group traffic is not balanced. In particular, the traffic of the server racks of the first group 510 is not balanced with respect to all of the other groups 520, 530, 540. The first group 510 has its traffic being routed solely to the aggregate nodes of the fourth group 540. In the first switch 510, the four switch inputs received from the first group 510 are routed to the four switch outputs output to the fourth group 540. The other three switches 552, 554, 556 show similar connectivity. The routing of the other aggregation switch nodes in the other groups are not shown in FIG. 5B, as the intent is to show a scenario in which unbalanced group-to-group traffic may occur over time. The group-to-group connections generally change slowly over time, so it is unlikely that traffic will change from balanced, as shown in FIG. 5A, to unbalanced, as shown in FIG. 5B from one allocation period to the next. However, such a change could potentially occur over a reasonably long duration. When an unbalanced traffic configuration is detected, it may be an opportunity to redistribute the server racks in the groups to obtain a traffic configuration that may be more balanced.

FIG. 5C is an example of a switching configuration having similar architecture to the arrangement of FIG. 5A, but in FIG. 5C group-to-group traffic is not balanced. In particular, the traffic of the server racks of the first group 510 is not balanced with respect to all of the other groups 520, 530, 540. Aggregation switch node (AN 1) 510A of the first group 510 has its traffic being routed solely to aggregation switch node (AN 16) 540D of the fourth group 540. In the first switch 550, the input from AN 1 510A received from the first group 510 is routed over one connection to the switch output for AN 16 540D in the fourth group 540. The other three switches 552, 554, 556 show similar connectivity. As in FIG. 5B, the routing of the other aggregation switch nodes in the other groups are not shown in FIG. 5C.

Figure 6A:
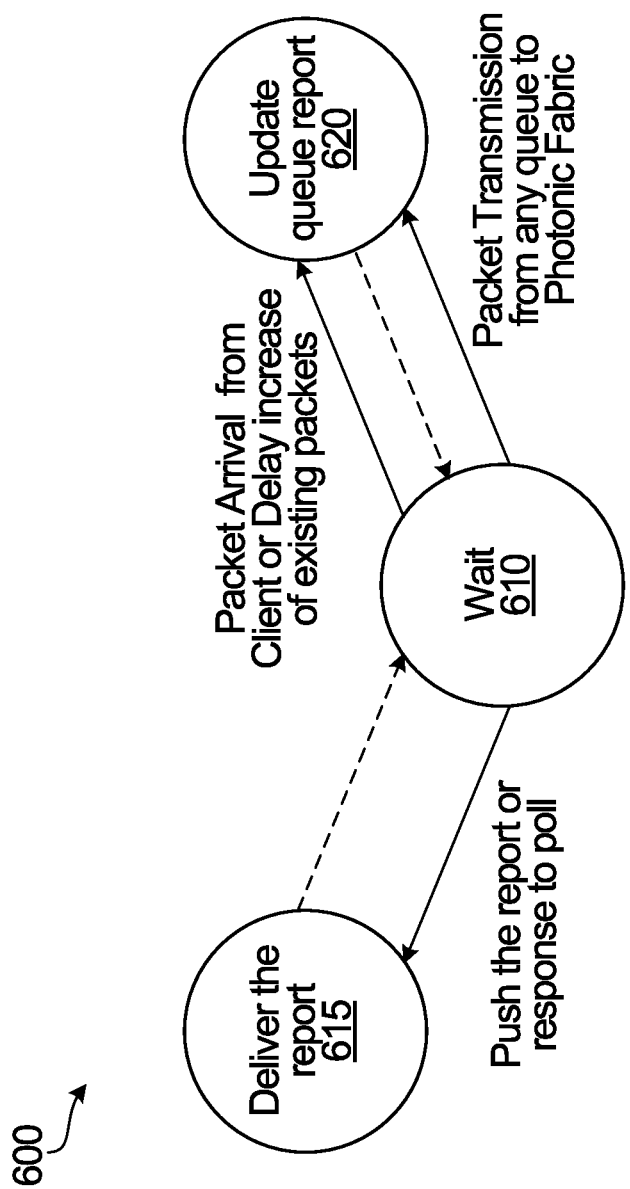
FIG. 6A is a state diagram illustrating a process for an aggregation switch node of a group reporting bandwidth demands to a group controller according to an aspect of the disclosure.

FIG. 6A is an example of a state diagram 600 for the operation of an aggregation switch node with regard to reporting bandwidth demand information to a group controller of a group of which the aggregation switch node is part. At 610 the aggregation switch node is waiting to either send a report or update a report. At 615 the aggregation switch node delivers the report by either pushing the report, or in response to a poll from the aggregation switch node. When the report is sent, the state returns to 610. Pushing the report may be initiated several ways. The push may be periodic or the pushed may be based on a performance metric, for example, but not limited to, latency of the queued packets or the urgency of the information. At 620 the aggregation switch node updates the report based on 1) arrival of data from a server or based on latency of the queued packets in an aggregation switch node awaiting transmission through the photonic fabric or 2) packet transmission from any queue to the photonic fabric, and then returns to 610.

In embodiments in which there are G groups of pods of server racks, and each group has N pods, each pod with an associated aggregation switch node, and there is a single class of data transmission traffic, each aggregation switch node can be considered to have a total of G×N queues of traffic to be reported. If there are k classes of quality of service (QoS), then the number of queues may be a function of k, the number G of groups and the number N of aggregation switch nodes, i.e. k(G.N) queues.

Figure 6B:
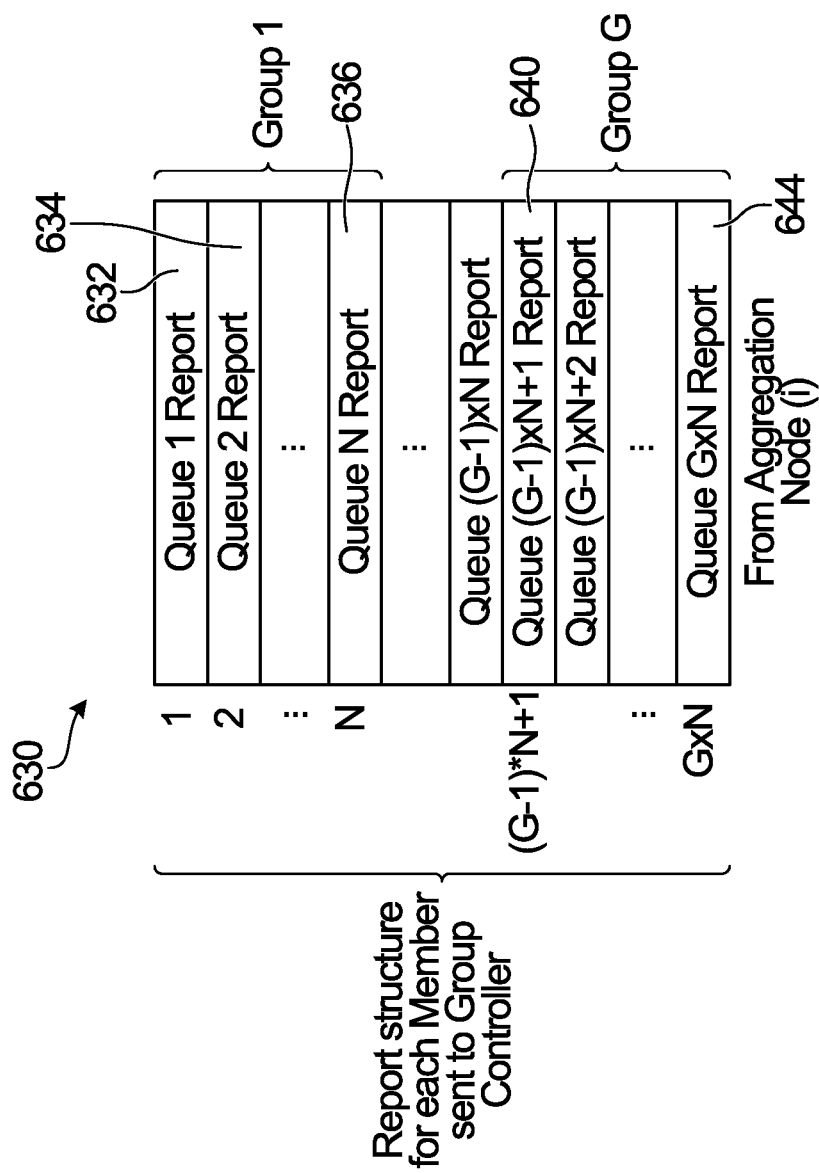
FIG. 6B is a block diagram of a reporting structure from an aggregation switch node to a group controller according to an aspect of the disclosure.

An example of a report 630 generated by an aggregation switch node for transmission to the group controller is shown in FIG. 6B. The report 630 provides an indication of a bandwidth demand that servers controlled by the aggregation switch node have for transmission of data to other servers controlled by the same aggregation switch node, to other servers controlled by aggregation switch nodes in its own group and to servers controlled by aggregation switch nodes in other groups. At the beginning of the report 630, Queue 1 report 632 is an indication of the bandwidth that servers controlled by the aggregation switch node demand to transmit to other servers controlled by the same aggregation switch node in the same group. Queue 2 report 634 is an indication of the bandwidth that servers controlled by the aggregation switch node demand to transmit to servers controlled by a second aggregation switch node in the same group. Queue N report 636 is an indication of the bandwidth that servers controlled by the aggregation switch node demand with servers controlled by an Nth aggregation switch node in the same group. These first N reports correspond to the bandwidth demand for the same first group. As there are G such groups, there are G×N total reports. Closer to the end of the report 630 for the Gth group, Queue (G−1)×N+1 report 640 is an indication of the bandwidth that servers controlled by the aggregation switch node demand to transmit to servers controlled by a first aggregation switch node in the Gth Group and Queue G×N report 644 is an indication of the bandwidth that servers controlled by the aggregation switch node demand to transmit to servers controlled by an Nth aggregation switch node in the Gth Group.

Figure 7A:
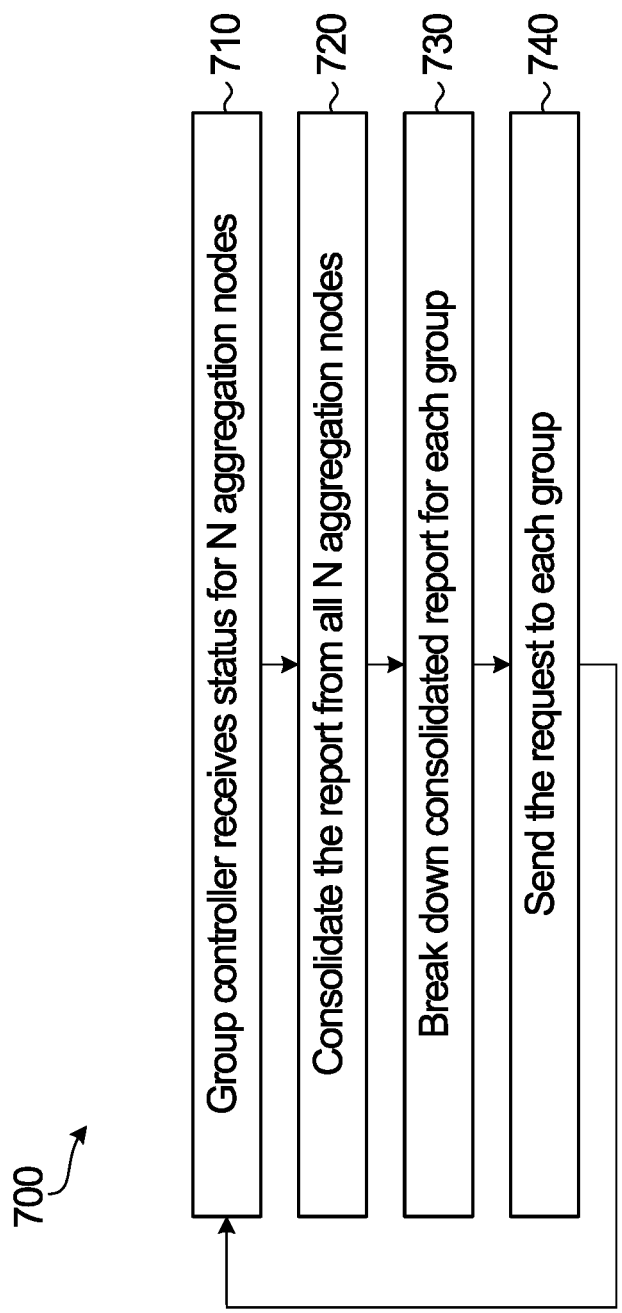
FIG. 7A is a flow chart describing a method for a group controller to process information received from multiple aggregation switch nodes according to an aspect of the disclosure.
Figure 7B:
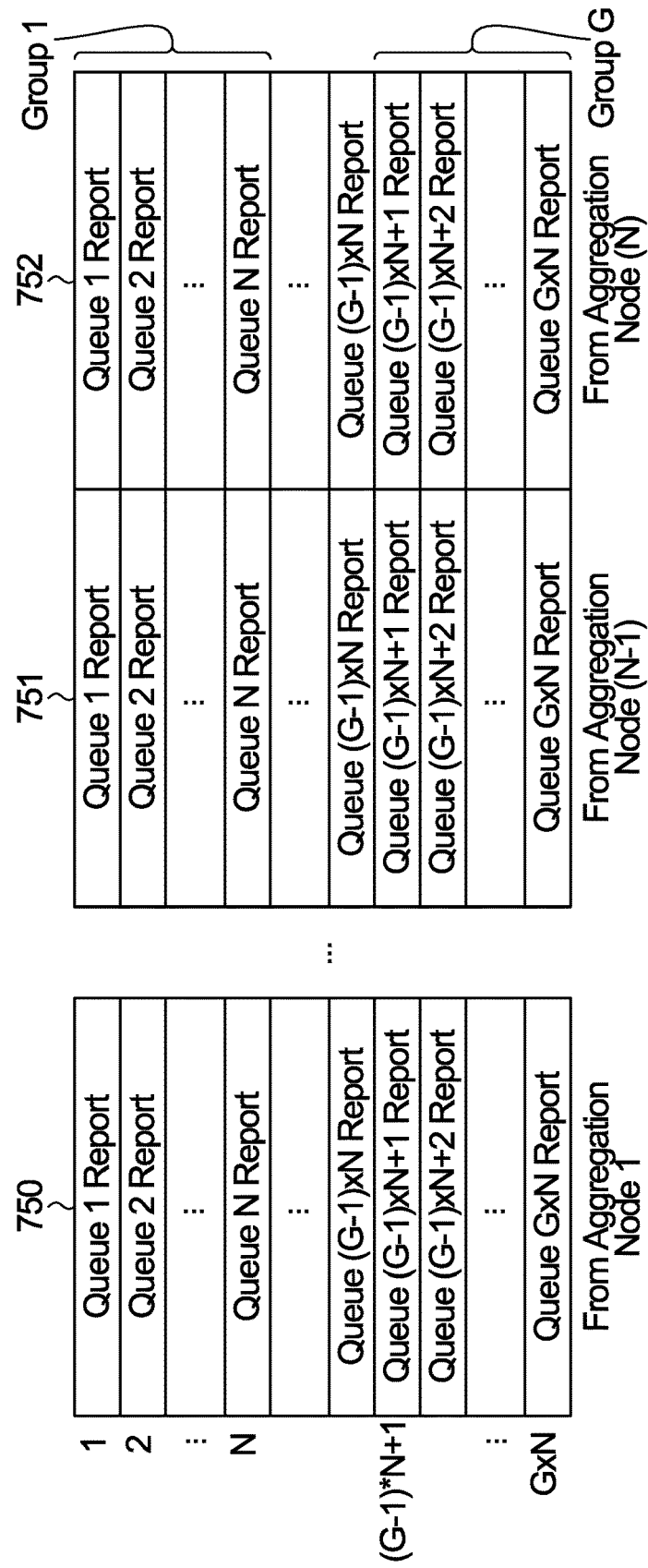
FIG. 7B is a block diagram illustrating consolidation of bandwidth demand reports at a group controller according to an aspect of the disclosure.

FIG. 7A is a more detailed flow chart 700 of steps that may be performed to implement step 430 of FIG. 4. In a first step 710, a group controller receives the status for the N aggregation switch nodes in the group in the form of reports of bandwidth demands for each queue. FIG. 7B illustrates an example of the reports received from the first through Nth aggregation switch nodes of a first group. Report 750 is a report from a first aggregation switch node of the first group, report 751 is a report from an (N−1)$^{th}$ aggregation switch node of the first group and report 752 is a report from an N$^{th}$ aggregation switch node of the first group. The reports from the respective aggregation switch nodes illustrated in FIG. 7B are the substantially the same as those described above in FIG. 6B.

Referring again to FIG. 7A, the group controller receives the reports, at step 720 the group controller consolidates the reports received from the aggregation switch nodes in the group. At step 730, the group controller breaks down the consolidated reports for each group.

Figure 7C:
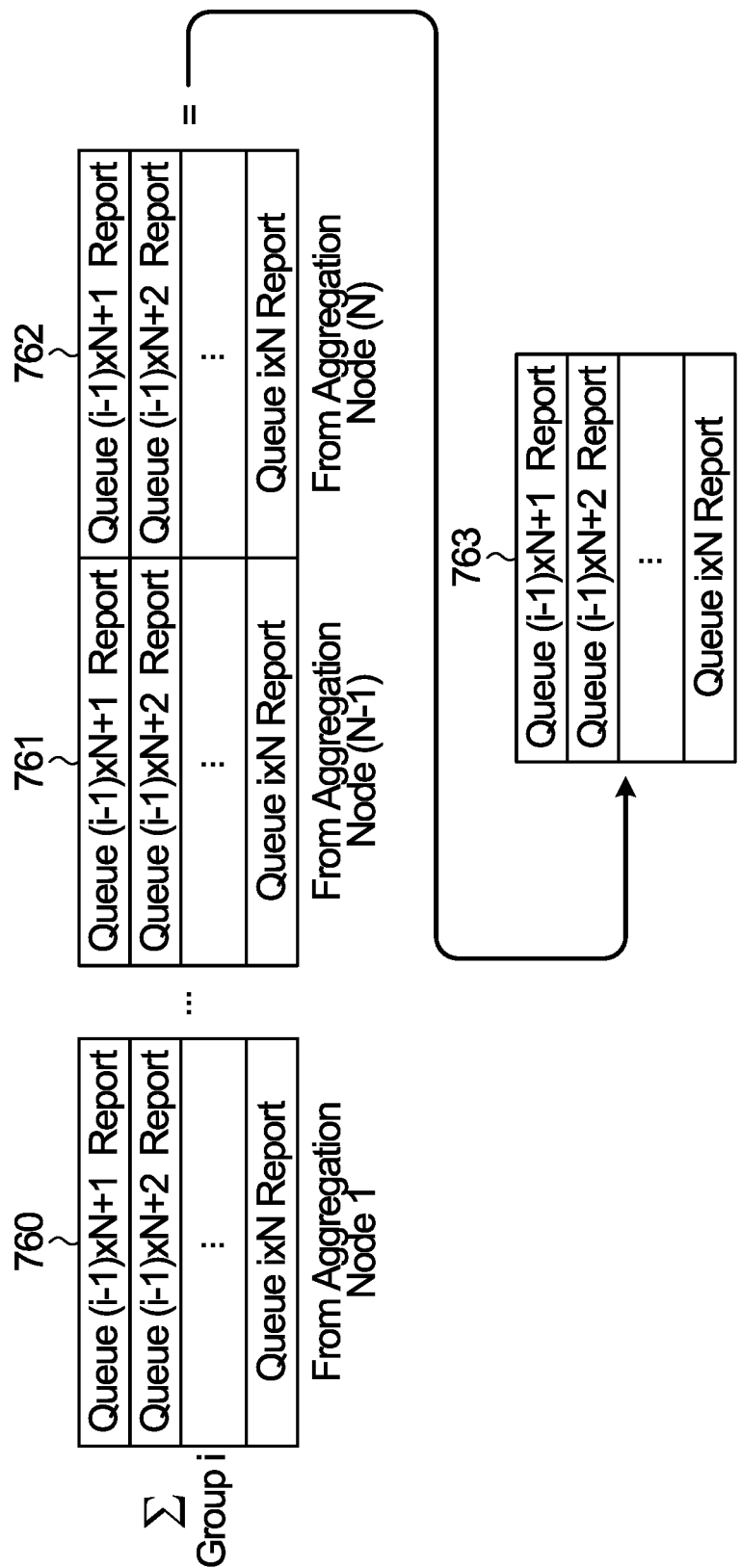
FIG. 7C is a block diagram illustrating consolidation of bandwidth demand reports at a group controller, for a particular group, according to an aspect of the disclosure.

FIG. 7C illustrates an example of how the reports are consolidated and broken down per group. To identify the bandwidth demands for a given group, for example Group i, the group controller of a first group consolidates the bandwidth demands to be transmitted to each aggregation switch node of Group i, as received from each aggregation switch node within the first group, i.e. reports 760, 761, 762, by adding together the bandwidth demands. This consolidation and break down per group results in a total bandwidth demand 763 from all of the aggregation switch nodes of the first group to be transmitted to each aggregation switch node within Group i. The group controller of the first group would perform a similar determination for each other group and the group controllers of each other group would perform a similar determination for each other group.

Referring once again to FIG. 7A, at step 740, the group controller sends a bandwidth demand request to each other group controller based on the consolidated report information.

Figure 8:
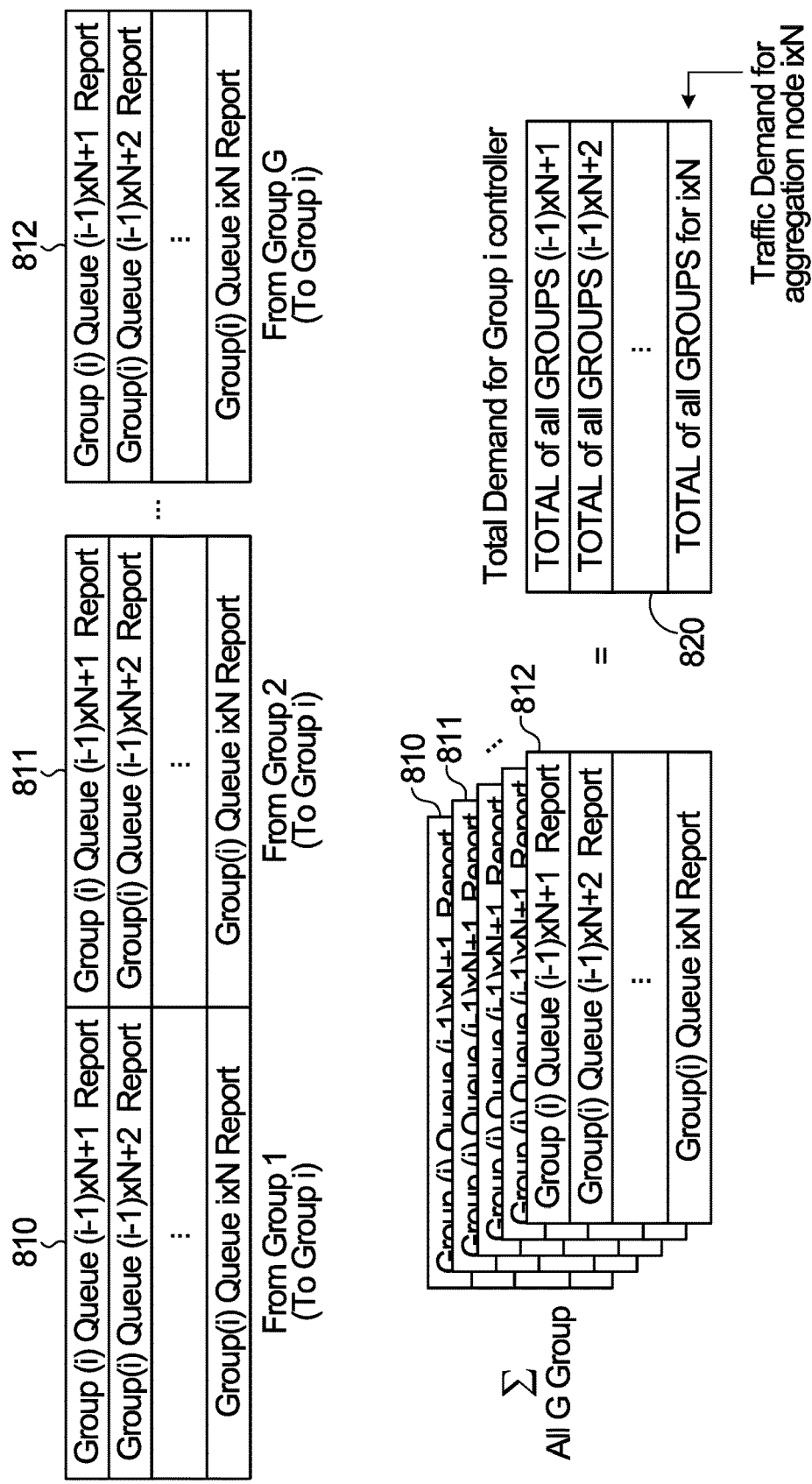
FIG. 8 is a block diagram illustrating consolidated bandwidth demand reports from multiple group controllers, for a particular group, according to an aspect of the disclosure.

FIG. 8 illustrates an example of a result of a group controller receiving the consolidated reports of the other groups, each consolidated report being a bandwidth demand of the group's bandwidth. FIG. 8 illustrates a collection of consolidated group reports 810, 811, 812, in which each report is the consolidated report sent by a respective group controller of the other multiple groups to inform the group controller of the bandwidth demand upon the group by the other groups. For example where Group i is a group receiving the consolidated reports, consolidated report 810 is the bandwidth demand of Group 1, sent by Group 1's group controller to the group controller of Group i, consolidated report 811 is the bandwidth demand of Group 2, sent by Group 2's group controller to the group controller of Group i, and consolidated report 812 is the bandwidth demand of Group G, sent by Group G's group controller to the group controller of Group i.

FIG. 8 also shows the sum of the multiple consolidated reports 810, 811, 812 resulting in a total bandwidth demand for each aggregation switch node (i.e. bandwidth for the servers overseen by each of the 1 to N aggregation switch nodes) of Group i in the form of report 820.

Referring back to step 440 of FIG. 4 in which the group controller of a respective group allocates its bandwidth capacity, once the group controller receives the bandwidth demands from the other group controllers, the group controller allocates bandwidth capacity for each other group. The bandwidth can be considered to have a granularity value defined in terms of a number of interfaces. For instance, if an aggregation switch node has 64 interfaces, each running at 100 Gbps, the total bandwidth of the aggregation node is 6.4 Tbps. Therefore, a change in bandwidth can be as small as 100 Gbps or 0.1 Tbps.

Shown below is one non-limiting example defining how demand received from all other groups can be allocated by a group controller of Group i, which manages N aggregation nodes in the group:

$$C_{ki,j}^{new} = \frac{D_{ki,j}}{\sum_{k=1}^{G} D_{ki,j}} \cdot A_j,$$

where $C_{ki,j}^{new}$ is the bandwidth that is allocated proportional to the demand $D_{ki,j}$ with consideration of total bandwidth demand from all other group controllers to this node.

In particular, $D_{ki,j}$ defines a total demand report of a Group k to Group i regarding the demand for aggregation switch node j, where k=1, 2, . . . , G and i=1, 2, . . . , G and j=(i−1)*N+1, . . . (i−1)*N+2, . . . i*N;

$C_{ki}^{new}$ defines a new capacity allocated for connectivity of Group k to Group i;

$A_j$ defines a total bandwidth (or number of interfaces) of aggregation Node j;

$C_{ki,j}^{new}$ defines a new capacity allocated for connectivity of Group k to aggregation Node j of Group i, wherein $$C_{ki}^{new} = \sum_{j=1}^{N} C_{ki,j}^{new}.$$

Other fairness allocation schemes, such as min-max fairness could be used to allocate this capacity.

The change in the bandwidth of Group k to aggregation Node j of Group i, $\Delta C_{ki,j}$ can be defined as $\Delta C_{ki,j} = C_{ki,j}^{new} - C_{ki,j}^{old}$. Total changes in Group i bandwidth to Group k is given by $$\Delta C_{ki} = \sum_{j=1}^{N} (C_{ki,j}^{new} - C_{ki,j}^{old}).$$

It is noted that intra-group changes in bandwidth can be derived from $\Delta C_{ki,j}$.

Referring back to step 450 of FIG. 4, once the group controller has determined the bandwidth capacity allocations for the other groups, the group controller is able to determine the delta bandwidth on a group-to-group basis knowing a current allocation period bandwidth capacity and the next period bandwidth capacity that has been determined. The group controller provides this delta bandwidth to the other group controllers and the group controller receives similar delta bandwidth from each of the other group controllers. The group controller also provides this delta bandwidth to the switch controller. The switch controller likewise receives delta bandwidth information from each of the other group controllers with respect to the other groups, to allow the switch controller in step 470 to determine the changes in the group-to-group routing of the switch that needs to take place in the core switches to enable the next period allocation.

Referring back to step 460 of FIG. 4, once the group controller has been made aware of the bandwidth capacity the group is allocated with respect to each of the other groups, and knows the bandwidth demand that the members of its own group has with respect to the other group, the group controller allocates bandwidth capacity for the members of the group.

In accordance with step 470 of FIG. 4, once the switch controller receives the delta bandwidth information from all of the group controllers, it uses that information to adjust the group-to-group connectivity in the cores switches. In addition, the intra-group connectivity may be adjusted based on the determinations made in step 460 of FIG. 4 described above.

In some embodiments, also part of step 470, once a group controller sees group connectivity bandwidth with another group is reduced, the group controller may decide to pause the traffic of at least one interface. If a bandwidth to a group is reduced, the group controller coordinates with members of the group so that one or more of the interfaces can be taken down.

The switch controller adjusts group-to-group connectivity after an initial set up delay. This set up delay allows pausing of traffic on downsized connections and also allows time to allocate upside connections. The group controller sends a message on the communication infra-structure that the reduction has been applied and that no traffic should traverse that interface. The switch controller is made aware of the application of the delta bandwidth and configures the group-to-group connections. When capacity of group-to-group connectivity is increased, the switch is likewise configured appropriately.

Figure 9:
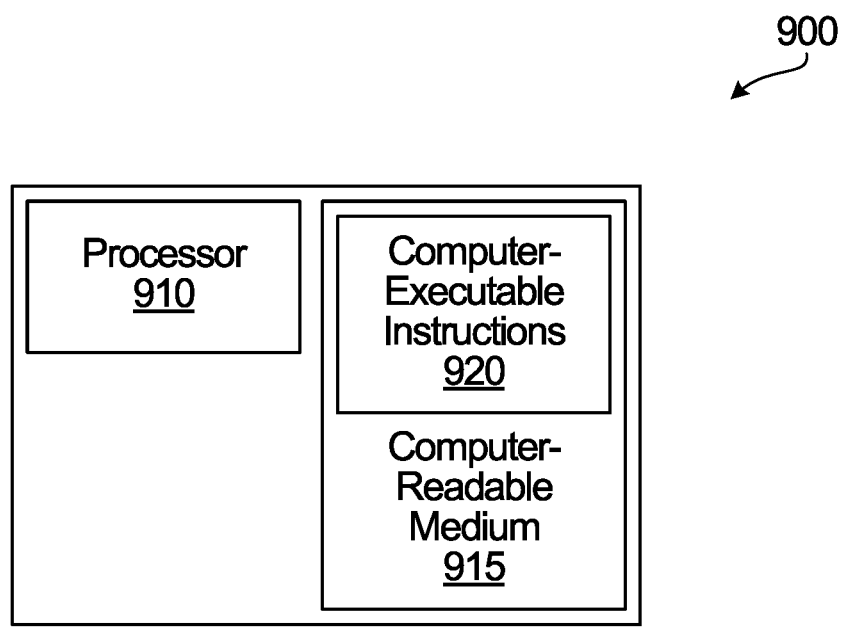
FIG. 9 is a block diagram of a group controller according to an aspect of the disclosure.

FIG. 9 is a block diagram of an example group controller 900 in which the group controller includes a processor 910 and computer-readable memory 915 for storing instructions 920. The instructions 920, when executed, allow the group controller to perform various functionalities. Examples of some of the various functionalities which will be described below with reference to FIGS. 10, 11 and 12. In some embodiments, as opposed to a processor and instructions in the form of software, the group controller may be implemented in hardware or a combination of hardware and software.

Figure 10:
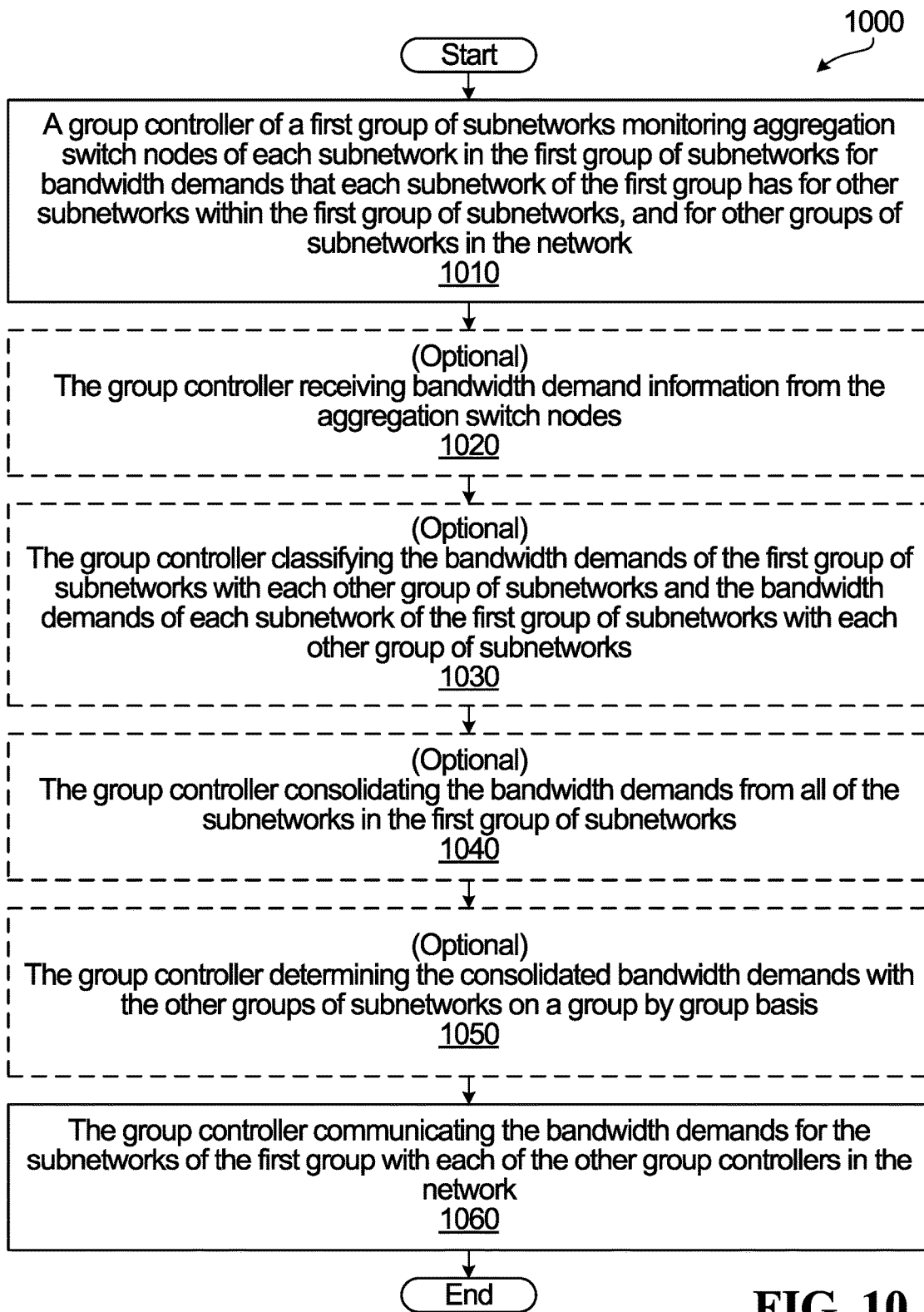
FIG. 10 is a flow chart describing a method according to an aspect of the disclosure.

A first functionality will be described with reference to FIG. 10 that substantially corresponds to step 430 of FIG. 4 and can be considered a method 1000 of determining bandwidth demands of the group. While each of the group controllers of the network may be performing the same functionality, the following is described in terms of what is being performed by a single group controller. A first step 1010 involves a group controller of a first group of subnetworks monitoring the aggregation switch nodes of each subnetwork in the first group for bandwidth demands that each subnetwork of the first group of subnetworks has for other subnetworks within the first group of subnetworks, and for other groups of subnetwork in the network. An optional second step 1020 involves the group controller receiving bandwidth demand information from the aggregation switch nodes. An optional third step 1230 involves the group controller classifying the bandwidth demands of the first group of subnetworks with each other group of subnetworks and the bandwidth demands of each subnetwork of the first group of subnetworks with each other group of subnetworks. An optional fourth step 1240 involves the group controller consolidating the bandwidth demands from all of the subnetworks in the first group of subnetworks. An optional fifth step 1250 involves the group controller determining the consolidated bandwidth demands with the other groups of pods on a group by group basis. The sixth step 1260 involves the group controller communicating the bandwidth demands for the subnetworks of the first group with each of the other group controllers in the network.

In some embodiments, step 1020 involves the group controller receiving bandwidth demand information from the aggregation switch nodes in a respective subnetwork pushed from the aggregation switch node of subnetwork. In other embodiments, step 1020 involves the group controller receiving bandwidth demand information from the aggregation switch nodes in a respective subnetwork in response to a poll from the group controller.

Figure 11:
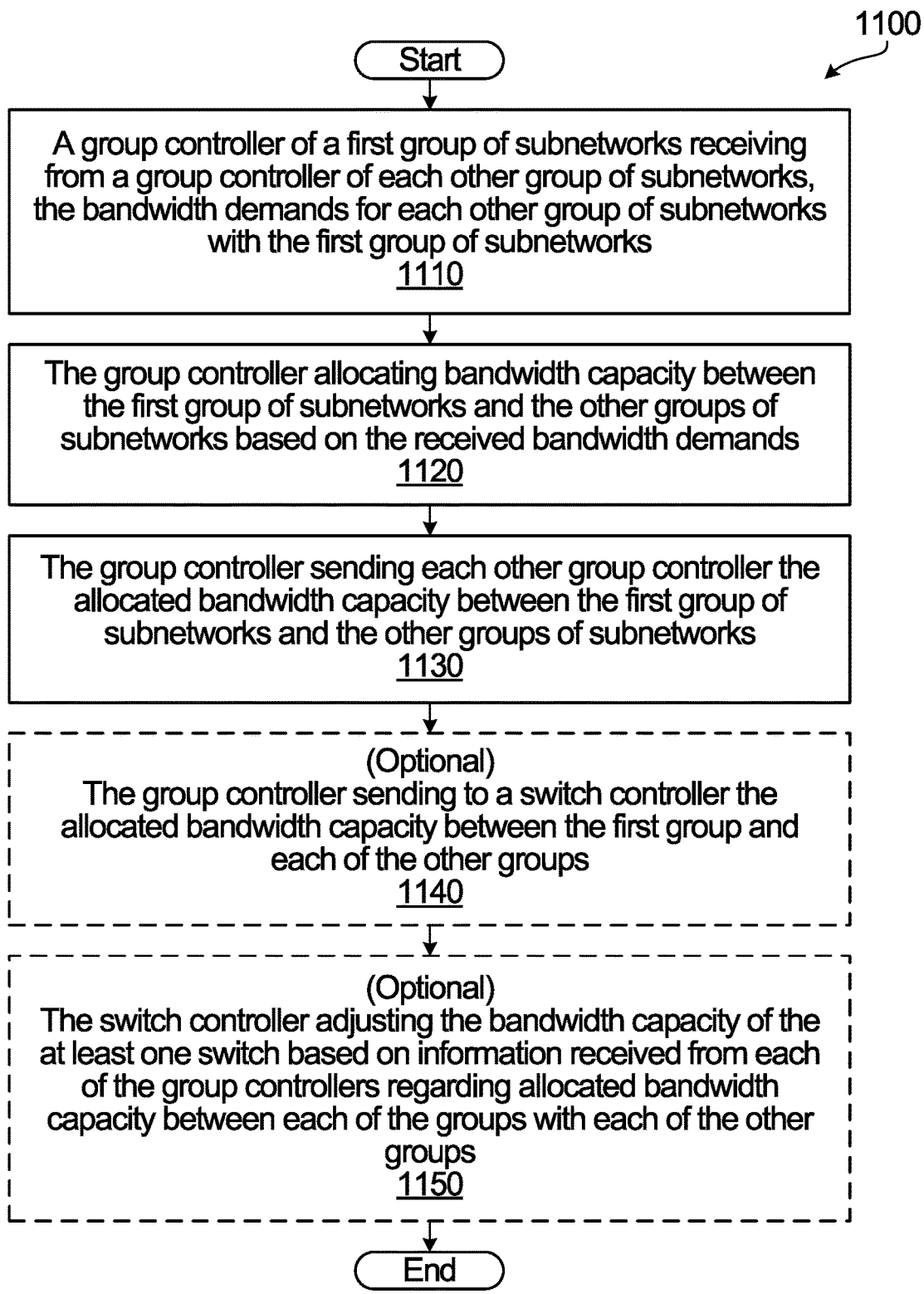
FIG. 11 is a flow chart describing a method according to an aspect of the disclosure.

A second functionality will be described with reference to FIG. 11 that substantially corresponds to step 440 of FIG. 4 and can be considered a method 1100 of allocating bandwidth. Again, while each of the group controllers in the network may be performing the same functionality, the following is described in terms of what is being performed by a single group controller. A first step 1110 involves a group controller of a first group of subnetworks receiving from a group controller of each other group of subnetworks, the bandwidth demands for each other group of subnetworks with the first group of subnetworks. A further step 1120 involves the group controller allocating bandwidth capacity between the first group of subnetworks and the other groups of subnetworks based on the received bandwidth demands. Step 1130 involves the group controller sending each other group controller the allocated bandwidth capacity between the first group of subnetworks and the other groups of subnetwork. An optional step 1140 involves the group controller sending to a switch controller the allocated bandwidth capacity between the first group and each of the other groups. A further optional step 1150 involves the switch controller adjusting the bandwidth capacity of the at least one switch based on information received from each of the group controllers regarding allocated bandwidth capacity between each of the groups with each of the other groups.

In some embodiments, when the group controller of the first group of subnetworks determines that allocated bandwidth capacity with another group is reduced, the group controller of the first group of subnetworks pauses traffic on at least one interface of at least one subnetwork of the first group of subnetworks to accommodate the reduction. For example, so as not to lose data when the at least one interface is no longer allocated for use by the at least one subnetwork in the first group of subnetwork. In some embodiments, this may involve the first group controller sending the at least one switch a change in the allocated bandwidth capacity between a previous allocated bandwidth capacity from the first group and each of the other groups and a current allocated bandwidth capacity from the first group and each of the other groups.

Figure 12:
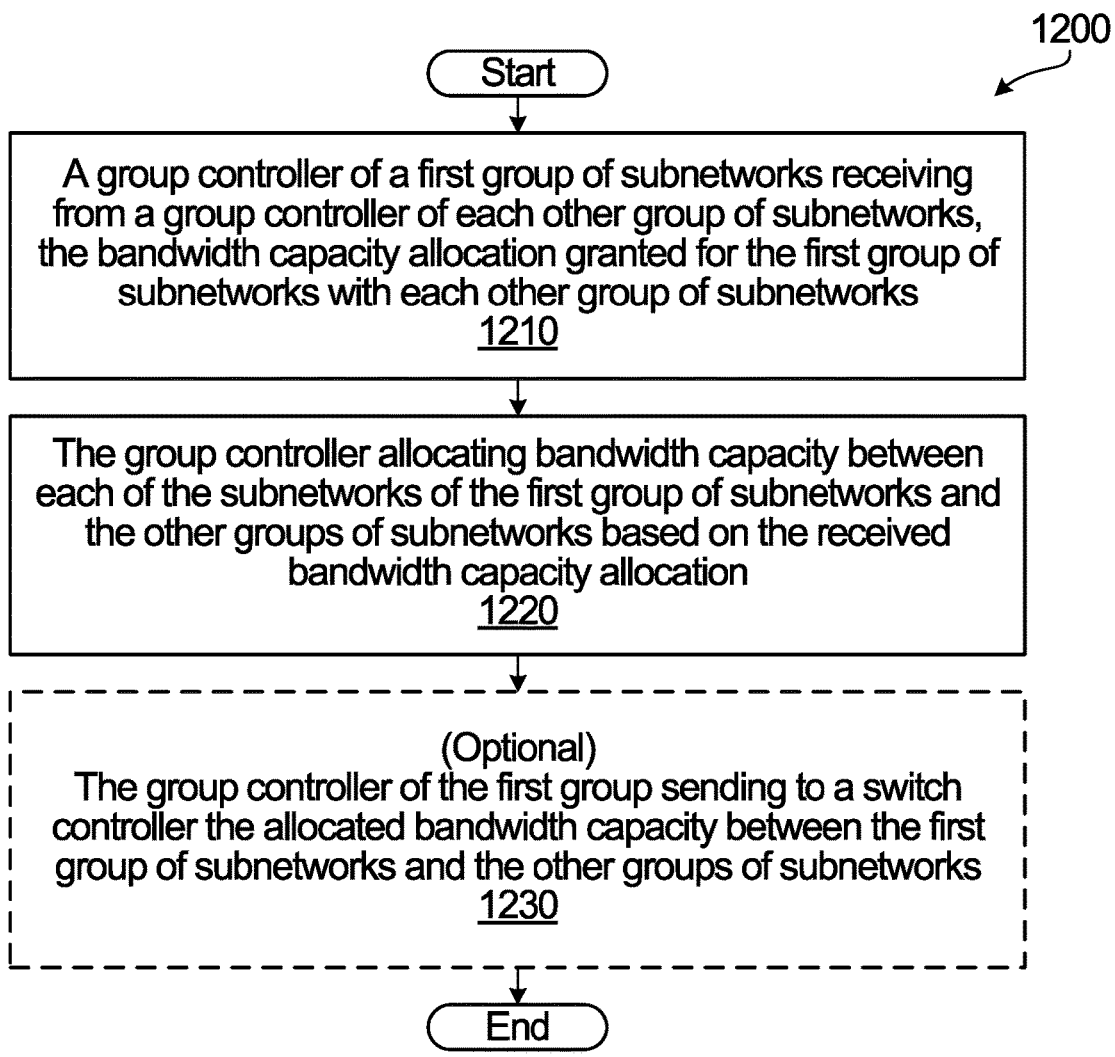
FIG. 12 is a flow chart describing a method according to an aspect of the disclosure.

A third functionality will be described with reference to FIG. 12 that substantially corresponds to step 460 of FIG. 4 and can be considered a method 1200 of allocating bandwidth. Again, while each of the group controllers the network may be performing the same functionality, the following is described in terms of what is being performed by a single group controller. A first step 1210 involves a group controller of a first group of subnetworks receiving from a group controller of each other group of subnetworks, the bandwidth capacity allocation granted for the first group of subnetworks with each other group of subnetworks. A second step 1220 involves allocating bandwidth capacity between each of the subnetworks of the first group of subnetworks and the other groups of subnetworks based on the received bandwidth capacity allocation. An optional third step 1230 involves the group controller of the first group sending to a switch controller the allocated bandwidth capacity between the first group of subnetworks and the other groups of subnetworks.

In some embodiments, the method may further include the switch controller adjusting the bandwidth capacity of the at least one switch allocated to the groups based on information received from the each of the group controllers regarding allocated bandwidth capacity between each of the groups of server racks with each of the other groups of server racks.

In some embodiments, allocating bandwidth capacity between each of the server racks of the first group of server racks and the other groups of server racks is further based on a fair distribution having regard to bandwidth demands of the server racks in the group of server racks.

Numerous modifications and variations of the present disclosure are possible in light of the above teachings. It is therefore to be understood that within the scope of the appended claims, the disclosure may be practised otherwise than as specifically described herein.

I claim:

1. A method of determining bandwidth demands for a network comprising a plurality of groups of sub-networks, each subnetwork comprising a plurality of server racks, each subnetwork in a group of subnetworks comprising an aggregation switch node configured to control the flow of traffic to and from the plurality of server racks in the subnetwork, the aggregation switch nodes in the network optically coupled to one another via at least one switch controlled by a switch controller, each group of subnetworks of the plurality of groups of subnetworks comprising a respective group controller in communication with each of the aggregation switch nodes in the group of subnetworks, and the group controllers communicatively coupled to one another, the method comprising:
   at a group controller of a first group of subnetworks:
       the group controller monitoring the aggregation switch nodes of each subnetwork in the first group for bandwidth demands that each subnetwork of the first group has for other subnetworks within the first group of subnetworks, and for other groups of subnetworks in the network; and
       the group controller communicating the bandwidth demands for the subnetworks of the first group with each of the other group controllers in the network.

2. The method of claim 1 wherein the group controller monitoring bandwidth demands comprises:
   classifying the bandwidth demands of the first group of subnetworks with each other group of subnetworks and the bandwidth demands of each subnetwork of the first group of subnetworks with each other group of subnetworks.

3. The method of claim 2 wherein classifying the bandwidth demands of the group of subnetworks with each other group of subnetworks and the bandwidth demands of each subnetwork of the group of subnetworks with each other group of subnetworks comprises:
   consolidating the bandwidth demands from all of the subnetworks in the first group of subnetworks; and
   determining the consolidated bandwidth demands with the other groups of subnetworks on a group by group basis.

4. The method of claim 1 wherein the group controller monitoring bandwidth demands comprises:
   the group controller receiving bandwidth demand information for the server racks in a respective subnetwork pushed from the aggregation switch node of the respective subnetwork; or
   the group controller receiving bandwidth demand information from the aggregation switch node of a respective subnetwork, for the server racks in the respective subnetwork in response to a poll from the group controller.

5. A method of allocating bandwidth for a network comprising a plurality of groups of subnetworks, a subnetwork comprising a plurality of server racks, each subnetwork in a group of subnetworks comprising an aggregation switch node configured to control the flow of traffic to and from the plurality of server racks in the subnetwork, the aggregation switch nodes in the network optically coupled to one another via at least one switch controlled by a switch controller, each group of subnetworks of the plurality of groups of subnetworks comprising a respective group controller in communication with each of the aggregation switch nodes in the group of subnetworks, and the group controllers communicatively coupled to one another, the method comprising:
   at a group controller of a first group of subnetworks:
       receiving from a group controller of each other group of subnetworks, the bandwidth demands for each other group of subnetworks with the first group of subnetworks;
       allocating bandwidth capacity between the first group of subnetworks and the other groups of subnetworks based on the received bandwidth demands; and
       sending each other group controller the allocated bandwidth capacity between the first group of subnetworks and the other groups of subnetworks.

6. The method of claim 5 further comprising:
   when the group controller of the first group determines that allocated bandwidth capacity with another group is reduced, the group controller of the first group pausing traffic on at least one interface of at least one subnetwork of the first group to accommodate the reduction.

7. The method of claim 5 further comprising the group controller sending to the switch controller the allocated bandwidth capacity between the first group and each of the other groups.

8. The method of claim 7 wherein the group controller sending to the switch controller the allocated bandwidth capacity between the first group and each of the other groups comprises the group controller sending the at least one switch an indication of a change in the allocated bandwidth capacity between a previous allocated bandwidth capacity for the first group and each of the other groups and a current allocated bandwidth capacity for the first group and each of the other groups.

9. The method of claim 8 further comprising the switch controller adjusting the bandwidth capacity of the at least one switch based on information received from each of the group controllers regarding allocated bandwidth capacity between each of the groups of subnetworks and each of the other groups of subnetworks.

10. A method of allocating bandwidth for a network comprising a plurality of groups of subnetworks, a subnetwork comprising a plurality of server racks, each subnetwork in a group of subnetworks comprising an aggregation switch node configured to control the flow of traffic to and from the plurality of server racks in the subnetwork, the aggregation switch nodes in the network optically coupled to one another via at least one switch controlled by a switch controller, each group of subnetworks of the plurality of groups of subnetworks comprising a respective group controller in communication with each of the aggregation switch nodes in the group of subnetworks, and the group controllers communicatively coupled to one another, the method comprising:
at a group controller of a first group of subnetworks:
receiving from a group controller of each other group of subnetworks, the bandwidth capacity allocation granted for the first group of subnetworks with each other group of subnetworks; and
allocating bandwidth capacity between each of the subnetworks of the first group of subnetworks and the other groups of subnetworks based on the received bandwidth capacity allocation.

11. The method of claim 10 further comprising:
the group controller of the first group sending to the switch controller, which is in communication with at least some of the other group controllers, the allocated bandwidth capacity between the first group and the other groups.

12. The method of claim 11 further comprising the switch controller adjusting the bandwidth capacity of the at least one switch allocated to the groups based on information received from the each of the group controllers regarding allocated bandwidth capacity between each of the groups of subnetworks and each of the other groups of subnetworks.

13. The method of claim 10 wherein allocating bandwidth capacity between each of the subnetworks of the first group of subnetworks and the other groups of subnetworks is further based on a fair distribution having regard to bandwidth demands of the subnetworks in the first group of subnetworks.

14. A system comprising:
at least one switch;
a switch controller configured to control the at least one switch;
a plurality of subnetworks, a subnetwork comprising a plurality of server racks, each subnetwork having an aggregation switch node configured to control the traffic flow to and from the subnetwork, and the subnetworks communicatively coupled to one another via the at least one switch, the plurality of subnetworks arranged in groups of subnetworks;
a plurality of group controllers, one group controller per group of subnetworks, each of the plurality of group controllers in communication with each of the aggregation switch nodes in the group, and the plurality of the group controllers communicatively coupled to one another, wherein each of the group controllers is configured to:
monitor bandwidth demands that each subnetwork of the respective group of subnetworks has for server racks within the subnetwork and for other subnetworks in the system and communicating the bandwidth demands of the group of subnetworks with each of the other group controllers in the system;
allocate bandwidth capacity between the group of subnetworks and the other groups of subnetworks based on the received bandwidth demands and send the other group controllers the allocated bandwidth capacity for the group of subnetworks and the other groups of subnetworks; and
receive from the other group controllers, the bandwidth capacity allocation granted for the group of subnetworks and the other groups of subnetworks and allocating bandwidth capacity between each of the subnetworks of the group of subnetworks and the other groups of subnetworks based on the received bandwidth capacity allocation.

15. The system of claim 14 wherein the group controllers for each of the plurality of groups of subnetworks are communicatively coupled to one another in a ring or mesh using high rate optical connections.

16. The system of claim 14 wherein the aggregation node of a given subnetwork is communicatively coupled to the group controller of the group of subnetworks in a ring connection or a star connection, with the group controller at the center, using low rate optical connections.

17. The system of claim 14 wherein the plurality of group controllers are communicatively coupled to the switch controller.

18. The system of claim 14, wherein the switch controller is a plurality of switch controllers, communicatively coupled to one another, that collectively control the at least one switch.

19. A group controller configured to control a first group of subnetworks, a subnetwork being defined as a plurality of server racks, the group controller in communication with a plurality of aggregation switch nodes, each aggregation switch node configured to control traffic flow to and from a plurality of server racks in a respective subnetwork, the group controller in communication with at least one other group controller that is configured to control at least one other group of subnetworks, the groups of subnetworks communicatively coupled to one another via at least one switch controlled by a switch controller, the group controller comprising:
a processor;
a non-transitory computer-readable medium having stored thereon computer-executable instructions, that when executed by the processor, cause the group controller to:
monitor bandwidth demands that each subnetwork of the first group of subnetworks has for server racks in the subnetwork and subnetworks of the at least one other group of subnetworks, via the aggregation switch nodes of each subnetwork in the first group of subnetworks; and
communicate the bandwidth demands for the subnetworks of the first group of subnetworks with each of the at least one other group controller.

20. The apparatus of claim 19, the computer-executable instructions, that when executed by the processor, further cause the group controller to:
receive from the at least one other group controller, the bandwidth demands for each other group of subnetworks with the first group of subnetworks;
allocate bandwidth capacity between the first group of subnetworks and each other group of subnetworks based on the received bandwidth demands;

send each other group controller the allocated bandwidth capacity between the first group of subnetworks and the other groups of subnetworks.

21. The apparatus of claim 20, the computer-executable instructions, that when executed by the processor, further cause the group controller to:
receive from the at least one other group controller, the allocated bandwidth capacity granted for the group of subnetworks by the group of subnetworks associated with the at least one other group controller;
allocate bandwidth capacity between each of the subnetworks of the first group of subnetworks and the other groups of subnetworks based on the received bandwidth capacity allocation.

22. The apparatus of claim 19 wherein the group controller is communicatively coupled to other group controllers in a ring or mesh using high rate optical connections, wherein high rate is in the range of 10 GHz to 100 GHz.

23. The apparatus of claim 19 wherein the group controller is communicatively coupled to the aggregation switch nodes in the group of subnetworks in a ring connection or a star connection, with the group controller at the center, using low rate optical connections, wherein low rate is in the range of 2.5 GHz to 10 GHz.

24. The apparatus of claim 19 wherein the group controller is communicatively coupled to the switch controller.

25. A method of allocating bandwidth demands for a network comprising a plurality of groups of subnetworks, a subnetwork comprising a plurality of server racks, each subnetwork in a group of subnetworks comprising an aggregation node configured to control the flow of traffic to and from the plurality of server racks in the subnetwork, the aggregation switch nodes in the network optically coupled to one another via at least one switch controlled by a switch controller, each group of subnetworks of the plurality of groups of subnetworks comprising a group controller in communication with each of the aggregation switch nodes in the group of subnetworks, and the group controllers communicatively coupled to one another, the method comprising:
the group controllers monitoring bandwidth demands that each subnetwork of the respective groups of subnetworks has for server racks within the subnetwork and for other subnetworks in the network and communicating the bandwidth demands of the groups with each of the other group controllers in the network;
the group controllers allocating bandwidth capacity between their own group of subnetworks and the other groups of subnetworks based on the received bandwidth demands and each group controller sending the other group controllers the allocated bandwidth capacity for the group of subnetworks and the other groups of subnetworks; and
each group controller receiving from the other group controllers, the bandwidth capacity allocation granted for the group of subnetworks and the other groups of subnetworks and allocating bandwidth capacity between each of the subnetworks of the group of subnetworks and the other groups of subnetworks based on the received bandwidth capacity allocation.

* * * * *